US012782539B1

(12) United States Patent
Hong et al.

(10) Patent No.: US 12,782,539 B1
(45) Date of Patent: Nov. 3, 2026

(54) EGOSPEED ESTIMATION FOR CENTRALIZED RADAR SYSTEMS

(71) Applicant: Oculii Corp., Beavercreek, OH (US)

(72) Inventors: Lang Hong, Beavercreek, OH (US); Steven Hong, Xenia, OH (US); Ruiyue Chen, McLean, VA (US); Kiran Vaidyanathan, Beavercreek, OH (US)

(73) Assignee: Oculii Corp., Beavercreek, OH (US)

(*) Notice: Subject to any disclaimer, the term of this patent is extended or adjusted under 35 U.S.C. 154(b) by 239 days.

(21) Appl. No.: 18/634,013

(22) Filed: Apr. 12, 2024

Related U.S. Application Data

(63) Continuation-in-part of application No. 18/511,719, filed on Nov. 16, 2023, now Pat. No. 12,638,546, which is a continuation-in-part of application No. 18/140,958, filed on Apr. 28, 2023, now Pat. No. 12,607,713, which is a continuation-in-part of application No. 18/129,834, filed on Apr. 1, 2023, now Pat. No. 12,566,239.

(51) Int. Cl.

| | |
|---|---|
| ***G01S 13/42*** | (2006.01) |
| ***G01S 7/40*** | (2006.01) |
| ***G01S 7/41*** | (2006.01) |
| ***G01S 13/58*** | (2006.01) |
| ***G01S 13/931*** | (2020.01) |

(52) U.S. Cl.
CPC ............ *G01S 13/42* (2013.01); *G01S 7/4021* (2013.01); *G01S 7/415* (2013.01); *G01S 13/584* (2013.01); *G01S 2013/93271* (2020.01); *G01S 2013/93272* (2020.01)

(58) Field of Classification Search
None
See application file for complete search history.

(56) References Cited

U.S. PATENT DOCUMENTS

| | | | | |
|---|---|---|---|---|
| 12,504,530 | B1 * | 12/2025 | Chang | G01S 13/867 |
| 2020/0110154 | A1 * | 4/2020 | Moon | G01S 7/4972 |
| 2022/0187418 | A1 * | 6/2022 | Bialer | G01S 13/42 |
| 2024/0168148 | A1 * | 5/2024 | Wu | G01S 13/343 |

* cited by examiner

*Primary Examiner* — Whitney Moore
(74) *Attorney, Agent, or Firm* — Maiorana Patent Law, PA

(57) ABSTRACT

An apparatus comprising an interface and a processor. The interface may be configured to receive raw radar data from a plurality of radar devices. The radar devices may each be implemented at a respective edge site and the raw radar data may comprise sparsity. The processor may be configured to receive the raw radar data corresponding to the radar devices from the interface, perform virtual aperture imaging in response the raw radar data, perform an automatic calibration of a respective mounting angle for each of the radar devices, determine respective Doppler measurements of a plurality of targets in an environment, search a histogram of the Doppler measurements, and determine an ego speed of the apparatus in response to a peak of the histogram of the Doppler measurements and the respective mounting angles of the plurality of radar devices. The radar devices may provide a field of view of the environment.

20 Claims, 12 Drawing Sheets

EGOSPEED ESTIMATION FOR CENTRALIZED RADAR SYSTEMS

This application relates to U.S. patent application Ser. No. 18/511,719, filed on Nov. 16, 2023, which relates to U.S. patent application Ser. No. 18/140,958, filed on Apr. 28, 2023, which relates to U.S. patent application Ser. No. 18/129,834, filed on Apr. 1, 2023, which relates to U.S. patent application Ser. No. 17/556,221, filed on Dec. 20, 2021, which relates to U.S. patent application Ser. No. 16/704,409, filed on Dec. 5, 2019 (now U.S. Pat. No. 11,243,304, issued on Feb. 8, 2022), which relates to U.S. patent application Ser. No. 16/503,908, filed on Jul. 5, 2019 (now U.S. Pat. No. 10,564,277, issued on Feb. 18, 2020), which relates to U.S. patent application Ser. No. 16/032,369, filed on Jul. 11, 2018 (now U.S. Pat. No. 10,509,119, issued on Dec. 17, 2019), which relates to U.S. patent application Ser. No. 15/883,372, filed on Jan. 30, 2018 (now U.S. Pat. No. 10,048,366, issued on Aug. 14, 2018). Each of the mentioned applications are hereby incorporated by reference in its entirety.

FIELD OF THE INVENTION

The invention relates to radar detection generally and, more particularly, to a method and/or apparatus for implementing egospeed estimation for centralized radar systems.

BACKGROUND

Egospeed estimations provide valuable information for automotive applications such as predictive powertrain control, vehicle positioning, and relative vehicle distance calculations. Egospeed estimations can be used to determine the current position, orientation, and movement of the vehicle for driver assistance and autonomous driving applications. The accuracy of egospeed estimation is essential for various automotive applications.

Conventional speed measurements of a host vehicle (i.e., egospeed) are performed using data read from onboard sensors such as an odometer or measurements from external systems such as GPS/GNSS. Egospeed estimation using an odometer result in large uncertainties. For example, tire conditions are one factor that result in unreliable estimations from odometer measurements. Relying on external systems is also unreliable. For example, egospeed estimation using GPS is not available in GPS-denial environments such as tunnels, garages, or streets with high buildings where satellite signals are blocked.

Some conventional vehicles provide Doppler speed measurements from radar detections to estimate egospeed. However, the radar detection capability is limited. Generally, egospeed estimation is determined using a single radar device. Single radar devices are unreliable because of the limited field-of-view (FOV) of a single radar device. For example, radar devices are commonly front-mounted and the measurements can be blocked by another vehicle in front of the host vehicle. A single radar device does not capture a sufficient number of radar object detections for Doppler measurements with the precision and lack of ambiguity that is required to provide an egospeed estimation.

It would be desirable to implement egospeed estimation for centralized radar systems.

SUMMARY

The invention concerns an apparatus comprising an interface and a processor. The interface may be configured to receive raw radar data from a plurality of radar devices. The plurality of radar devices may each be implemented at a respective edge site and the raw radar data may comprise sparsity. The processor may be configured to receive the raw radar data corresponding to each of the radar devices from the interface, perform virtual aperture imaging in response the raw radar data, perform an automatic calibration of a respective mounting angle for each of the radar devices, determine respective Doppler measurements of a plurality of targets in an environment, search a histogram of the Doppler measurements, and determine an egospeed of the apparatus in response to a peak of the histogram of the Doppler measurements and the respective mounting angles of the plurality of radar devices. The plurality of radar devices may provide a field of view of the environment.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
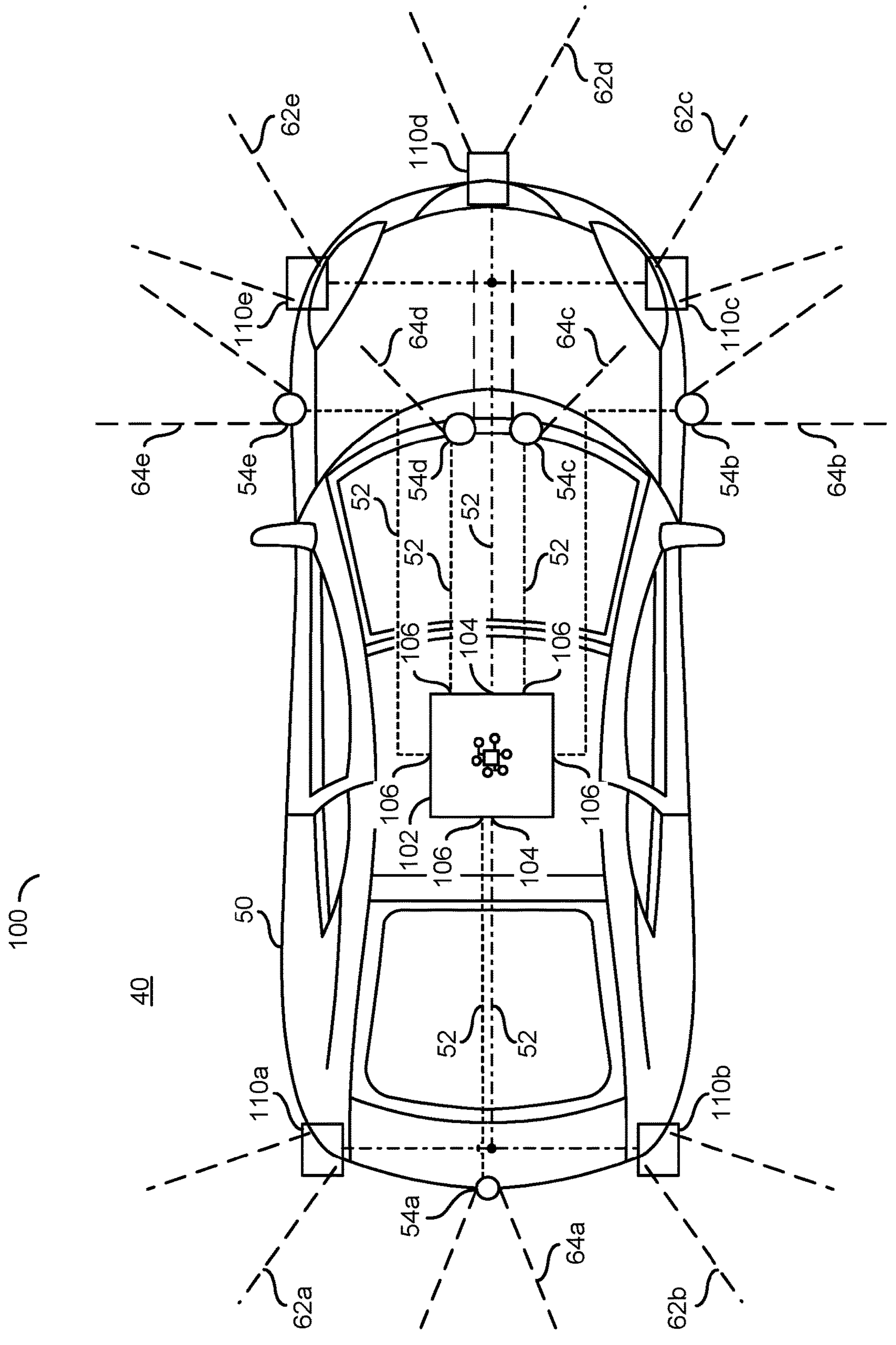
FIG. 1 is a diagram illustrating an embodiment of the present invention implemented in a vehicle.

Embodiments of the present invention include providing egospeed estimation for centralized radar systems that may (i) enable high accuracy egospeed estimation that may be robust to Doppler ambiguity, (ii) provide data for perception and localization for automotive applications, (iii) detect Doppler peaks, (iv) perform auto-calibration for radar devices to provide measurement consistency, (v) implement virtual aperture imaging, (vi) provide a wide-angle radar field of view, (vii) determine egospeed from Doppler measurements of static objects detected, (viii) implement a histogram flip to circumvent a maximum Doppler measurement value limitation and/or (ix) be implemented as one or more integrated circuits.

Embodiments of the present invention may be configured to determine an egospeed estimation for a host vehicle. The egospeed estimation may be determined in response to Doppler measurements captured from objects in an environment near the host vehicle. The host vehicle may implement multiple radar detection devices at edge locations of the vehicle configured to capture a wide angle field-of-view (FOV) of radar detections. In one example, the radar detection devices may capture a 360° FOV (e.g., a surround view, an all-around view, etc.) of the environment near the host vehicle. In another example, the radar detection devices may be configured to capture a wide angle FOV that provides less than a 360° FOV. Generally, the FOV of the radar detections may provide a sufficient range to capture Doppler measurements from multiple objects (e.g., static objects). The particular amount of coverage of the wide angle FOV captured by the radar detection devices and/or the number of static objects captured in the wide angle FOV to provide sufficient information for the egospeed estimation may be varied according to the design criteria of a particular implementation.

Embodiments of the present invention may implement a centralized processing device. The centralized processing device may be configured to receive low volume radar data from the multiple radar detection devices implemented on the host vehicle. For example, the radar detection devices may implement sparse antenna arrays that provide low data volume that may be efficiently communicated from the edge radar detection devices to the centralized processing device. The centralized processing device may be configured to perform virtual aperture imaging that may enable the generation of high resolution radar data from the low volume radar data provided by the sparse antenna arrays. The high resolution radar data may be analyzed by the centralized processing device to provide precise Doppler measurements without ambiguity.

Receiving the multiple sources of radar detection data may enable the centralized processing device to perform Doppler measurements from a large number of static objects over the wide angle FOV. Using the wide angle FOV radar detections from a centralized radar system, the egospeed estimation calculated by the centralized processing device may be robust in various different scenarios (e.g., the large FOV may provide a number of detections sufficient to calculate the egospeed from the Doppler measurements). For example, embodiments of the present invention may provide the egospeed estimation with high accuracy for all scenarios with stationary backgrounds (e.g., in tunnels, in areas with tall buildings, in garages, when some of the radar detection devices is blocked, etc.).

The centralized processing device may be configured to generate a Doppler measurement histogram. The Doppler measurement histogram may be used to estimate the egospeed. For example, a Doppler measurement that corresponds to a peak value of the Doppler measurement histogram may be used to estimate the egospeed with or without Doppler measurement ambiguity. In one example, the Doppler measurement histogram may be flipped one or more times to circumvent a maximum value limitation of the Doppler measurements. The number of flips performed may be varied according to the design criteria of a particular implementation.

The Doppler measurements may be reliant upon the accuracy and/or precision of the radar detections captured. The radar detection devices may be vulnerable to physical mounting errors (e.g., miscalibration). For example, radar detection devices may be installed improperly (e.g., an improper mounting angle), may be affected by vehicle impacts and/or may drift over time. Embodiments of the present invention may be configured to perform auto-calibration of the radar detection devices. The auto-calibration may be configured to correct radar detection data that may result from the radar mounting angle errors. Correcting the radar mounting angle errors may ensure a consistency between different radar detection devices and/or the accuracy of egospeed estimation.

The egospeed estimation may provide a motion speed of a host vehicle. The egospeed estimation determined may be used for various upstream vehicle applications. Egospeed may play an important role in perception and localization for automotive applications. Using the radar detections from the centralized radar system, embodiments of the present invention may estimate the egospeed with high accuracy and robustness to Doppler ambiguity. For example, to dynamically determine a position of a moving vehicle, the egospeed may be used (e.g., along with heading and other information). The particular upstream vehicle applications that rely on the egospeed estimation may be varied according to the design criteria of a particular implementation.

Referring to FIG. 1, a diagram illustrating an embodiment of the present invention implemented in a vehicle is shown. A system 100 is shown. The example embodiment of the system 100 may be shown in the context of a top down view of a vehicle 50 in an environment 40. The vehicle 50 may be a host vehicle for the system 100. In the example shown, the vehicle 50 may be a car. In some embodiments, the vehicle 50 may be a truck, an ATV, an airplane, a drone, etc. In one example, the vehicle 50 may be an electric vehicle (EV). In another example, the vehicle 50 may be a hybrid electric vehicle. In yet another example, the vehicle 50 may be an internal combustion engine (ICE) vehicle. The type of the vehicle 50 implementing the system 100 may be varied according to the design criteria of a particular implementation.

The vehicle 50 may comprise a data network 52, a number of blocks (or circuits) 54*a*-54*e*, a block (or circuit) 102, an interface 104, an interface 106 and/or a number of blocks (or circuits) 110*a*-110*e*. The circuits 54*a*-54*e* may each implement a camera system. The circuit 102 may implement a centralized processing device. The circuits 110*a*-110*e* may each implement a radar device and/or frontend. While the radar frontends 110*a*-110*e* and the camera systems 54*a*-54*e* are shown, the vehicle 50 may comprise more or fewer of the radar frontends 110*a*-110*e* and/or the camera systems 54*a*-54*e*. In some embodiments, the vehicle 50 may comprise multiple implementations of the centralized processing device 102. The vehicle 50 may comprise other components (not shown). For example, other types of sensors may be implemented (e.g., sonar, lidar, ultrasonics, etc.). The number, type and/or arrangement of the components of the vehicle 50 may be varied according to the design criteria of a particular implementation.

The data network 52 may be implemented throughout the vehicle 50. The data network 52 may be configured to communicate data from an edge site of the vehicle 50 (e.g., an edge site at the locations of the radar frontends 110*a*-110*e* and/or the camera systems 54*a*-54*e*) to other components of the vehicle 50. In an example, the data network 52 may be configured to communicate data from various sensors to corresponding ECUs. In another example, the data network 52 may be configured to communicate data to/from the centralized processing device 102. The data network 52 may be configured to communicate data according to a predefined protocol (e.g., a CAN bus communications protocol, an I2C bus protocol, an Ethernet protocol, a wireless protocol, etc.). Generally, the data network 52 may comprise a low bandwidth, low cost data bus implemented by the vehicle 50 (e.g., data buses that may be common in commercially available vehicles). In one example, the data network 52 may implement a CAN bus of the vehicle 50. In some embodiments, the amount of data communicated throughout the vehicle 50 may be limited to the constraints of the data network 52. The implementation of the data network 52 may be varied according to the design criteria of a particular implementation.

The centralized processing device 102 may be configured to communicate data to/from the data network 52. The centralized processing device 102 may comprise the interface 104 and/or the interface 106. The interface 104 may be a radar data interface. The radar data interface 104 may be configured to receive data communicated by the radar frontends 110*a*-110*e* via the data network 52. The radar data interface 104 may be configured to send data generated from the centralized processing device 102 via the data network 52 to one or more of the radar frontends 110*a*-110*e*. The interface 106 may be a video data interface. The video data interface 106 may be configured to receive data communicated by the camera systems 54*a*-54*e* via the data network 52. The video data interface 106 may be configured to send data generated from the centralized processing device 102 via the data network 52 to one or more of the camera systems 54*a*-54*e*. Additional interfaces (e.g., a sensor data interface) may be implemented by the centralized processing device 102 (e.g., to communicate data to/from various other sensors, not shown). In some embodiments, the radar data interface 104 and/or the video data interface 106 may comprise a number of data ports. The radar data interface 104 and/or the video data interface 106 may be configured to convert and/or translate data for compatibility with the communication standard implemented by the data network 52. The number, type and/or implementation of the radar data interface 104, the video data interface 106 and/or other interfaces of the centralized processing device 102 may be varied according to the design criteria of a particular implementation.

The radar devices (or frontends) 110*a*-110*e* may be located at various edge sites of the vehicle 50. The edge sites of the vehicle 50 may be located at a periphery of the vehicle 50 and/or throughout the vehicle 50. In the example shown, the radar frontend 110*d* may be implemented on a front bumper of the vehicle 50. In another example, the radar frontends 110*a*-110*b* are shown implemented on either side of a rear bumper of the vehicle 50. In some embodiments, one or more of the radar frontends 110*a*-110*e* may be implemented on a periphery of the vehicle 50. In some embodiments, one or more of the radar frontends 110*a*-110*e* may be implemented on a roof the vehicle 50. The number of radar frontends 110*a*-110*e* implemented and/or the particular edge sites of the vehicle 50 that the radar frontends 110*a*-110*e* may be implemented at may be varied according to the design criteria of a particular implementation.

The radar frontends 110*a*-110*e* may each be configured to determine a proximity and/or location of objects/obstacles around the vehicle 50. The radar frontends 110*a*-110*e* may be configured as long-range and/or short-range sensors. The radar frontends 110*a*-110*e* may be configured to generate a radar (or probe) signal, which may be reflected back to the radar frontends 110*a*-110*e* by the objects near the vehicle 50. The reflected data received by the radar frontends 110*a*-110*e* corresponding to the radar signal may be processed and/or analyzed in order to generate data about the objects in the environment 40 near the vehicle 50. In some embodiments, the data generated by the radar frontends 110*a*-110*e* may be used by the centralized processing device 102 to create a radar mapping of the environment 40.

Pairs of dashed lines 62*a*-62*e* are each shown extending from a respective one of the radar frontends 110*a*-110*e*. The pairs of dashed lines 62*a*-62*e* may represent a radio frequency pattern emitted by the respective radar frontends 110*a*-110*e*. The shape, intensity and/or direction of the radio frequency patterns 62*a*-62*e* may determine a detection range of the radar frontends 110*a*-110*e*. The radar frontends 110*a*-110*e* may be implemented at various locations around the vehicle 50. The radio frequency patterns 62*a*-62*e* may be generally emitted all around the vehicle 50 in order to capture data about the environment 40 in all directions from the vehicle 50. The radio frequency patterns 62*a*-62*e* may have a range of approximately 200 meters to 450 meters, with a 150 degree azimuth field of view and a 45 degree elevation field of view. The particular range of the radio frequency patterns 62*a*-62*e* may be varied according to the design criteria of a particular implementation.

The radar frontends 110*a*-110*e* may each implement an antenna array and/or waveguide network. The antenna array and/or waveguide network implemented by the radar frontends 110*a*-110*e* may enable a sparse array configured to provide information that may be used by the centralized processing device 102 to reconstruct a high resolution of data. In an example, the radar frontends 110*a*-110*e* may each be configured to generate a dynamic waveform and the centralized processing device 102 may use artificial intelligence to learn from and/or adapt to the environment 40 near the vehicle 50. The sparse array implemented by the radar frontends 110*a*-110*e* may enable a high resolution of data to be acquired with a low module cost. The radar frontends 110*a*-110*e* may be configured to generate raw radar data at a low volume that may be converted to a high resolution of data while consuming between 3 watts to 10 watts of power. Details of the antenna array and/or waveguide network implemented by the radar frontends 110*a*-110*e* may be described in association with U.S. application Ser. No. 17/945,379, filed on Sep. 15, 2022 and U.S. application Ser. No. 17/958,268, filed on Sep. 30, 2022, appropriate portions of which are incorporated by reference.

In some embodiments, the radar frontends 110*a*-110*e* may comprise antenna arrays that generate raw radar data with sparsity (e.g., low volume data). In some embodiments, the radar frontends 110*a*-110*e* may comprise antenna arrays with a dense array that generate raw radar data without sparsity (e.g., high volume data). In some embodiments, the radar frontends 110*a*-110*e* may comprise a combination of radar devices with sparsity and without sparsity. Radar data without sparsity may undergo data sparsification (e.g., as an aftermarket add-on) to convert the high volume of data to a low volume of data before being sent over the data network 52. Details of the antenna array implemented with sparsity may be described in association with U.S. application Ser. No. 18/129,834, filed on Apr. 1, 2023, appropriate portions of which are incorporated by reference.

The camera systems 54*a*-54*e* may be configured to capture pixel data, generate images and/or generate video frames of the environment 40 near the vehicle 50. In some embodiments, the pixel data may be communicated over the data network 52 to the centralized processing device 102 and the centralized processing device 102 may be configured to generate video frames in response to the pixel data. In some embodiments, the camera systems 54*a*-54*e* may be configured to generate video frames in response to the pixel data captured, compress the video frames and the compressed video frames may be communicated over the data network 52 to the centralized processing device 102. The video frames generated based on the data from the camera systems 54*a*-54*e* may be used for computer vision operations to detect objects/obstacles around the vehicle 50. The camera systems 54*a*-54*e* may comprise RGB cameras, RGB-IR cameras, stereo cameras, monocular cameras, thermal imaging cameras, etc. The number and/or types of the camera systems 54*a*-54*e* implemented may be varied according to the design criteria of a particular implementation.

Pairs of dashed lines 64*a*-64*e* are each shown extending from a respective one of the camera systems 54*a*-54*e*. The pairs of dashed lines 64*a*-64*e* may represent a field of view captured by the camera systems 54*a*-54*e*. The fields of view 64*a*-64*e* of the camera systems 54*a*-54*e* may or may not overlap with the regions covered by the radio frequency patterns 62*a*-62*e* of the radar frontends 110*a*-110*e*. The camera systems 54*a*-54*e* may be implemented at various locations (e.g., edge sites) around the vehicle 50. The fields of view 64*a*-64*e* may be generally captured all around the vehicle 50 in order to capture data of the environment 40 in all directions from the vehicle 50 (e.g., a 360 degree field of view). The particular range and/or directions of the fields of view 64*a*-64*e* may be varied according to the design criteria of a particular implementation.

The centralized processing device 102 is shown at a generally central location in the vehicle 50. In an example, the centralized processing device 102 may implement a zone (or domain) processor. The centralized processing device 102 may be configured to receive input comprising the output from the radar frontends 110*a*-110*e* (e.g., raw radar data) and/or the video frames generated by the camera systems 54*a*-54*e*. In some embodiments, multiple implementations of the centralized processing device 102 may be implemented near groups (or clusters) of the radar frontends 110*a*-110*e* and/or the camera systems 54*a*-54*e* (e.g., at a particular zone of the vehicle 50). The location(s) of the centralized processing device 102 and/or the number of the radar frontends 110*a*-110*e* and/or camera systems 54*a*-54*e* that provide data to the centralized processing device 102 may be varied according to the design criteria of a particular implementation.

The centralized processing device 102 may be configured to process raw data streams generated by the radar frontends 110*a*-110*e*, the camera systems 54*a*-54*e* and/or other sensors. The centralized processing device 102 may be configured to implement deep sensor fusion in order to combine interpretations of the data from the radar frontends 110*a*-110*e* with interpretations of the data from the camera systems 54*a*-54*e* and/or data inputs from other sensors (not shown) in order to make inferences using multiple sources of data that would not be possible based on one of the data sources alone. In an example, the centralized processing device 102 may be configured to interpret the high resolution data generated in response to the low volume data provided by the radar frontends 110*a*-110*e*. In another example, the centralized processing device 102 may be configured to perform computer vision operations on the video frames generated by the camera systems 54*a*-54*e* in order to detect objects.

The centralized processing device 102 may be configured to implement central compute capabilities that enable high performance without implementing a dedicated processor for each of the radar frontends 110*a*-110*e*. Implementing the centralized processing device 102 may enable the radar frontends 110*a*-110*e* to be implemented at a lower cost because a dedicated processor may not be implemented for each of the radar frontends 110*a*-110*e*. The centralized processing device 102 may be configured to enable sparsity in the implementation of the radar frontends 110*a*-110*e* in order to determine the boundary conditions for a particular resolution of data. The centralized processing device 102 may enable the radar frontends 110*a*-110*e* to undersample the environment while preventing artifacts, grading lobes and/or false alarms.

The centralized processing device 102 may be configured to adaptively modulate the information generated by the radar frontends 110*a*-110*e* to enable fewer antennas to be implemented in the antenna arrays of the radar frontends 110*a*-110*e*. Instead of processing data from the radar frontends 110*a*-110*e* at the edge (e.g., one processor on-board with the same technology node for each of the radar frontends 110*a*-110*e*), the sparse (e.g., low volume) raw radar data from the radar frontends 110*a*-110*e* may be processed by the centralized processing device 102. The sparse antenna array implemented by the radar frontends 110*a*-110*e* may enable low bandwidth data to be transmitted from the radar frontends 110*a*-110*e* over the data network 52 to the centralized processing device 102. The centralized processing device 102 may be configured to expand the resolution of the data received from the radar frontends 110*a*-110*e*. The centralized processing device 102 may be configured to dynamically shift radar processing capabilities around the vehicle 50 on an as-needed basis in response to various detection scenarios. The centralized processing device 102 may be configured to implement joint bistatic processing from multiple of the distributed radar frontends 110*a*-110*e* to provide a high resolution and/or sensitivity.

The centralized processing device 102 may utilize a dynamic adaptive waveform. The centralized processing device 102 may learn and/or adapt to the environment 40. The centralized processing device 102 may take advantage of sparsity to capture the boundary conditions for the data that may be used for providing a particular resolution. Sparsity may undersample the environment 40. To avoid grading lobes and/or artifacts that may result from multiple solutions that may be available for reconstructing a dense amount of data using sparsity, an adaptive waveform may be implemented. The adaptive waveform used for the radio frequency patterns 62*a*-62*e* may provide a shifting waveform that may be effectively controlled in a deterministic fashion. By adaptively modulating the information, fewer antennas may be used by each of the radar frontends 110*a*-110*e*. Artifacts from the sparsity may be suppressed by aggregating information that may be adaptive over time. The adaptive waveform implemented may provide a sparse data cube that may enable reconstructing a high resolution of radar detections that no longer scales with the number of antennas implemented by the radar frontends 110*a*-110*e*. The high resolution of the radar detections may scale with how efficiently the centralized processing device 102 performs computations and/or how quickly a phase may be modulated onto the adaptive transmitted signal.

Figure 2:
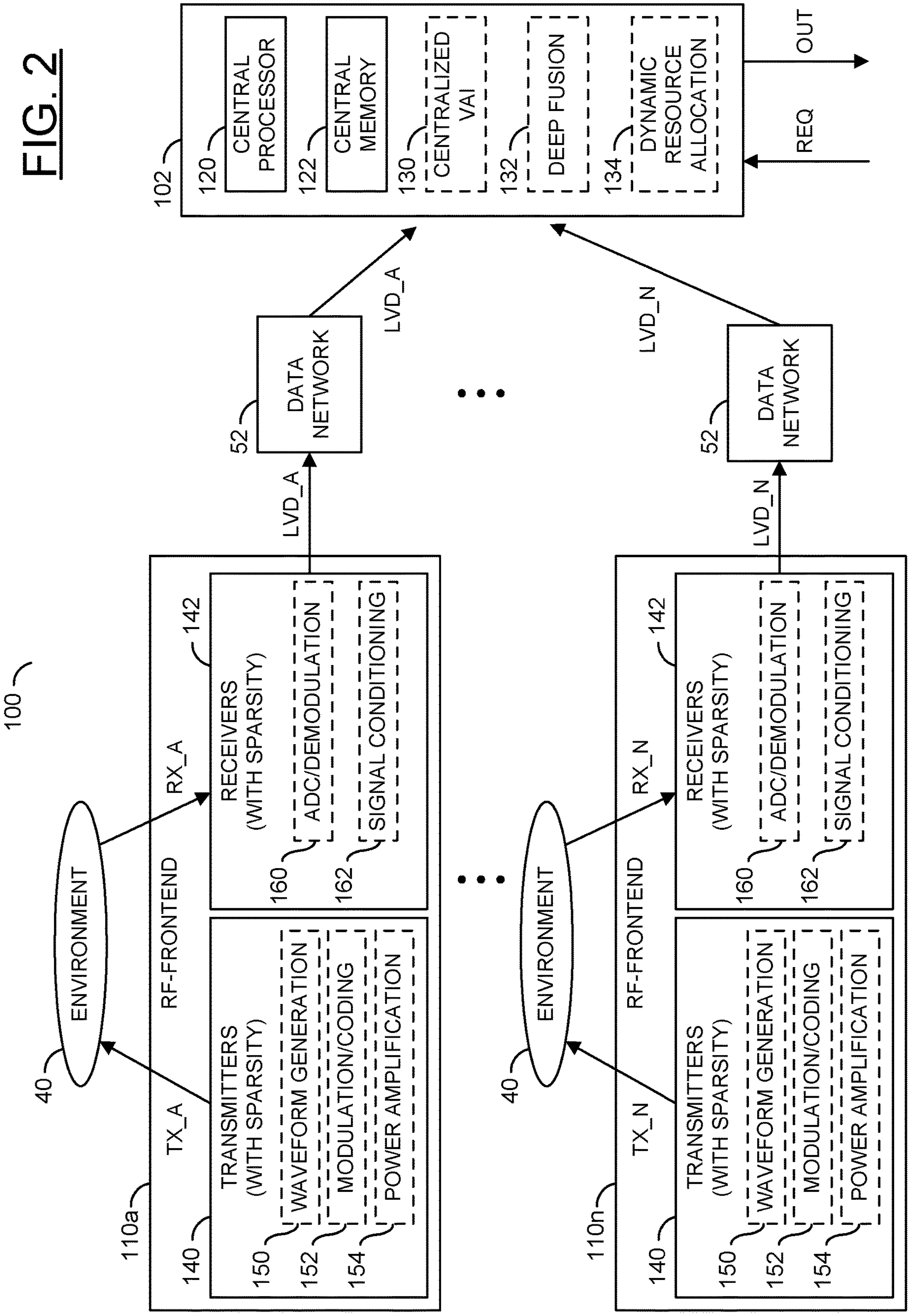
FIG. 2 is a block diagram illustrating an example embodiment of a radar system with sparse antennas and a processing chain.

Referring to FIG. 2, a block diagram illustrating an example embodiment of a radar system with sparse antennas and a processing chain is shown. The apparatus 100 is shown comprising the centralized processing device 102 and/or the radar frontends 110*a*-110*n*. The radar frontends 110*a*-110*n* may each be configured to transmit data to and/or receive data from the environment 40. The radar frontends 110*a*-110*n* may each be configured to communicate with the centralized processing device 102 via the data network 52.

The centralized processing device 102 may comprise a block (or circuit) 120 and/or a block (or circuit) 122. The block 120 may implement a central processor. The block 122 may implement a central memory. The centralized processing device 102 may comprise other components (not shown). The central processor 120 and/or the central memory 122 may be configured to implement a block (or module) 130, a block (or module) 132 and/or a block (or module) 134. The module 130 may implement centralized virtual aperture imaging (CVAI). The module 132 may implement centralized deep sensor fusion. The module 134 may implement dynamic resource allocation and/or dynamic scheduling. The number, type and/or arrangement of the components of the centralized processing device 102 and/or the functionality implemented by the centralized processing device 102 may be varied according to the design criteria of a particular implementation.

Each of the radar frontends **110*a*-110*n* may comprise a block (or circuit) 140 and/or a block (or circuit) 142. The circuit 140 may implement a transmitter. The circuit 142 may implement a receiver. The radar frontends 110*a*-110*n* may comprise other components (not shown). The number, type and/or arrangement of the components of the radar frontends 110*a*-110*n*** may be varied according to the design criteria of a particular implementation.

The transmitters 140 of the radar frontends **110*a*-110*n* may be configured to generate respective signals (e.g., TX_A-TX_N). The signals TX_A-TX_N may be output signals transmitted to the environment 40. In an example, each of the signals TX_A-TX_N may be a probe signal. Each of the probe signals TX_A-TX_N generated may comprise individual waveform characteristics. In an example, a first probe signal TX_A generated by the transmitter 140 of the radar frontend 110*a* may comprise a first distinct (or unique or predefined) waveform characteristic, then a second probe signal TX_A generated by the transmitter 140 of the radar frontend 110*a* may comprise a second distinct (or unique or predefined) waveform, etc. In some embodiments, each of the probe signals TX_A-TX_N may cycle through a predefined set of a number of distinct waveform characteristics. In some embodiments, each of the probe signals TX_A-TX_N may comprise the same waveform characteristic during the same timeframe (e.g., at a first timeframe, each of the probe signals TX_A-TX_N may emit the first waveform characteristic from different edge sites to the environment 40, then at a second timeframe, each of the probe signals TX_A-TX_N may emit the second waveform characteristic from different edge sites to the environment 40**, etc.). The types of the probe signals TX_A-TX_N generated may be varied according to the design criteria of a particular implementation.

The transmitters 140 may each comprise a block (or circuit) 150, a block (or circuit) 152 and/or a block (or circuit) 154. The block 150 may implement a waveform generation module. The block 152 may implement a modulation/coding module. The block 154 may implement a power amplification module. The transmitters 140 may each comprise other components (not shown). The number, type and/or arrangement of the components of the transmitters 140 may be varied according to the design criteria of a particular implementation.

The waveform generation module 150 may be configured to generate the probe signals TX_A-TX_N comprising the various waveform characteristics. The modulation/coding module 152 may be configured to select a communication frequency for the waveform characteristics for the probe signals TX_A-TX_N. In an example, the modulation/coding module 152 may select a high frequency carrier signal and/or channel for communicating the probe signals TX_A-TX_N. The power amplification module 154 may be configured to provide a power level for the probe signals TX_A-TX_N. For example, in response to the power level selected by the power amplification module 154 and the frequency selected by the modulation/coding module 152, the waveform generation module 150 may output the probe signals TX_A-TX_N from the transmitters 140 with the distinct waveform characteristics.

The receivers 142 of the radar frontends **110*a*-110*n* may be configured to receive respective signals (e.g., RX_A-RX_N) and/or generate respective signals (e.g., LVD_A-LVD_N). The signals RX_A-RX_N may be input signals received from the environment 40. In an example, each of the probe signals TX_A-TX_N may be reflected back from objects in the environment 40 and received as the reflected signals RX_A-RX_N. The receivers 142 may be configured to perform various operations on the reflected signals RX_A-RX_N. For example, the operations performed by the receivers 142** may enable the various waveform characteristics of the transmitted signals TX_A-TX_N to be extracted and/or isolated in the reflected signals RX_A-RX_N. The reflected signals RX_A-RX_N may correspond to the waveform characteristics of the probe signals TX_A-TX_N.

The signals LVD_A-LVD_N may comprise raw radar data generated by the receivers 142. In one example, the signals LVD_A-LVD_N may communicate a radar data cube. The radar data cube may comprise raw radar data generated by the receivers 142. The operations performed by the receivers 142 may be configured to generate the raw radar data LVD_A-LVD_N in response to the reflected signals RX_A-RX_N. Generally, the raw radar data LVD_A-LVD_N may comprise a low volume of data. For example, the low volume of data of the raw radar data LVD_A-LVD_N may be enabled because of the sparsity of the antenna arrays of the transmitters 140 and the receivers 142. In one example, the antenna arrays implemented by the transmitters 140 and/or the receivers 142 implementing the sparse antenna array may comprise twelve antenna heads. The raw radar data LVD_A-LVD_N may be transmitted to the data network 52. Each of the radar frontends **110*a*-110*n*** may generate a respective one of the radar data cubes (e.g., during a data acquisition time).

The receivers 142 may each comprise a block (or circuit) 160 and/or a block (or circuit) 162. The block 160 may implement an analog to digital conversion (ADC) and/or demodulation module. The block 162 may implement a signal conditioning module. The receivers 142 may each comprise other components (not shown). The number, type and/or arrangement of the components of the receivers 142 may be varied according to the design criteria of a particular implementation.

The ADC and/or demodulation module 160 may be configured to perform analog to digital conversion and/or demodulation operations on the reflected signals RX_A-RX_N. The ADC operations may comprise sampling and/or quantization in order to convert the analog reflected signals RX_A-RX_N to a digital version that may be operated on digitally. The demodulation operations may be configured to retrieve the waveform characteristics from the reflected signals RX_A-RX_N that may have been adapted to a particular transmission channel. In an example, the demodulation operations may extract and/or isolate the waveform characteristics in the reflected signals RX_A-RX_N (e.g., the unique characteristics that correspond to the probe signals TX_A-TX_N). The signal conditioning module 154 may be configured to prepare the reflected signals RX_A-RX_N for communication via the data network 52. For example, in response to waveform characteristics extracted from the reflected signals RX_A-RX_N by the demodulation module 160, the signal conditioning module 162 may output the raw radar data LVD_A-LVD_N from the receivers 142. The demodulation module 160 and/or the signal conditioning module 162 may perform ambiguity resolution. The ambiguity resolution may be determined in response to data of the waveform characteristics received from the modulation/coding module 152.

In the example shown, each of the transmitters 140 and/or the receivers 142 implemented by the radar frontends **110*a*-110*n* may implement sparsity. For example, each of the radar frontends 110*a*-110*n* may comprise the transmitters 140 and/or the receivers 142 without implementing a local memory and/or a local processor. For example, each of the radar frontends 110*a*-110*n* may generate the raw radar data LVD_A-LVD_N with the low data volume, and rely on the centralized processing device 102** to generate the high resolution data from the raw radar data LVD_A-LVD_N.

In some embodiments, not all of the radar frontends **110*a*-110*n* of the apparatus 100 may implement sparsity. In an example, one or more of the radar frontends 110*a*-110*n* may be implemented without sparsity. In the example, where with the radar frontends without sparsity, each of the radar frontends 110*a*-110*e*** that do not implement sparsity may generate a high volume of raw radar data. For example, the volume of data in the raw radar data LVD_A-LVD_N generated with sparsity may be less than the high volume of the raw radar data generated without sparsity (e.g., by a factor of sixteen).

In another example, one or more of the radar frontends **110*a*-110*n* may be implemented with local memories and/or local processors. The local processors implemented by the radar frontends 110*a*-110*n* may analyze the high volume of raw radar data generated by the receivers 142 (without sparsity) and determine radar detections. The local processors implemented by the radar frontends 110*a*-110*n* may comprise a high volume of data that may be communicated over the data network 52. Generally, the apparatus 100 may be implemented with each of the radar frontends 110*a*-110*n* implemented with sparsity and the centralized processing device 102 may receive the low volume raw radar data LVD_A-LVD_N communicated over the data network 52. However, in some embodiments, the centralized processing device 102 may be configured to be backwards compatible and/or operate as an aftermarket addition to the vehicle 50 that may be configured to also work with a high volume of raw radar data generated by radar devices that do not implement sparsity and/or radar devices that implement local memories and local processors that provide radar detection output. In some embodiments, the apparatus 100 may comprise a data sparsification module that may be installed in the radar frontends 110*a*-110*n* that may convert raw radar data without sparsity to raw radar data with sparsity before the data is sent to the data network 52**, which may be described in association with U.S. application Ser. No. 18/129,834, filed on Apr. 1, 2023, appropriate portions of which are incorporated by reference.

The central processor 120 may be configured to execute computer readable instructions. In response to executing the computer readable instructions, the central processor 120 may be configured to perform a number of steps. The central processor 120 may be configured to receive the raw radar data LVD_A-LVD_N from the radar frontends **110*a*-110*n* (e.g., at the radar data interface 104). For example, the receivers 142 may communicate the low volume raw radar data LVD_A-LVD_N to the data network 52 and the central processor 120 may receive the raw radar data LVD_A-LVD_N from the data network 52. The central processor 120 may be configured to perform virtual aperture imaging in response to the raw radar data LVD_A-LVD_N. For example, the central processor 120 may use the virtual aperture imaging to receive the continuous stream of the raw radar data LVD_A-LVD_N to generate a large size data cube representing the information detected about the environment 40. The central processor 120** may be configured to generate high resolution radar data based on the virtual aperture imaging. The high resolution radar data may provide radar detections.

In some embodiments, the central processor 120 may implement one or more coprocessors, cores and/or chiplets. For example, the central processor 120 may implement one coprocessor configured as a general purpose processor and another coprocessor configured as a video processor. In some embodiments, the central processor 120 may implement a dataflow vector processor. In some embodiments, the central processor 120 may be a dedicated hardware module designed to perform particular tasks. In an example, the central processor 120 may implement an AI accelerator. In another example, the central processor 120 may implement a radar processor. In some embodiments, other processors implemented by the apparatus 100 may be generic processors and/or video processors (e.g., a coprocessor that is physically a different chipset and/or silicon from the central processor 120). In one example, the central processor 120 may implement an x86-64 instruction set. In another example, the central processor 120 may implement an ARM instruction set. In yet another example, the central processor 120 may implement a RISC-V instruction set. The number of cores, coprocessors, the design optimization and/or the instruction set implemented by the central processor 120 may be varied according to the design criteria of a particular implementation.

The central memory 122 may provide data storage for the apparatus 100. The central memory 122 may be configured to store the computer readable instruction that may be executed by the central processor 120. The central memory 122 may be configured to store video data, the raw radar data LVD_A-LVD_N, data cubes, high resolution radar detections and/or sensor output. The central memory 122 may provide volatile and/or non-volatile storage. The central memory 122 may provide mass data storage. The central memory 122 may comprise embedded memory and/or removable storage. In an example, the central memory 122 may implement a cache. In another example, the central memory 122 may implement a SD card (or microSD card). The central memory 122 may be configured to store training data for an AI model. The type and/or capacity of the central memory 122 may be varied according to the design criteria of a particular implementation.

The combination of the central processor 120 and the central memory 122, may enable the radar frontends **110*a*-110*n* to be implemented with no individual local processors and/or no individual local memories. The central processor 120 may provide more processing capabilities than a local processor that may be implemented by each edge radar device that does not implement the apparatus 100. Similarly, the central memory 122 may provide more memory capacity than a local memory that may be implemented by each radar device that does not implement the centralized radar architecture of the apparatus 100. In one example, the central processor 120 may be configured to provide a processing bandwidth of approximately 1.3G (ADC samples/s) compared to a typical local processor (e.g., implemented at the edge sites with the radar frontends 110***a*-110*n*) that may provide a processing bandwidth of 31M (ADC samples/s). In another example, the central memory 122 may comprise approximately 32 GB of memory (or more) compared to a typical memory of a local processor (e.g., implemented at the edge sites with the radar frontends 110*a*-110*n*) that may provide approximately 8 MB of memory. The central processor 120 may be configured to be implemented on modern technology and/or fabrication nodes. In an example, the central processor 120 may be implemented on a 5 nm technology node, while a local processor may be limited to a technology node used for the radar transceiver (e.g., the local processors may not be optimized for digital processing and may be constrained by technology used for RF processing). The combination of the central processor 120 and the central memory 122 may be configured to implement the CVAI 130, the centralized deep sensor fusion module 132, the dynamic resource allocation module 134 and/or the dynamic scheduling.

The CVAI 130 may be configured to receive the low volume raw radar LVD_A-LVD_N from each of the radar frontends 110*a*-110*n*. The CVAI 130 may be configured to perform virtual aperture imaging for reconstructing high resolution detections based on the each of the signals LVD_A-LVD_N. The virtual aperture imaging may be configured to use the waveform characteristics in the raw radar data LVD_A-LVD_N in order to generate physical antenna data, extrapolated virtual antenna data and/or interpolated virtual antenna data. For example, the virtual aperture imaging may enable additional data points (e.g., the extrapolated virtual antenna data and/or the interpolated virtual antenna data) to be generated in order to provide a high resolution of data based on the sparse physical antenna data. The virtual aperture imaging may enable a dense array of virtual antenna data to be provided in response to the sparse arrangement of the physical antennas implemented by one of the radar frontends 110*a*-110*n*. Details of the virtual aperture imaging may be described in association with U.S. application Ser. No. 17/832,278 filed on Jun. 3, 2022 (issued as U.S. Pat. No. 11,561,299), U.S. application Ser. No. 17/556,221 filed on Dec. 20, 2021, U.S. application Ser. No. 16/704,409, filed Dec. 5, 2019 (issued as U.S. Pat. No. 11,243,304), U.S. application Ser. No. 16/503,908, filed Jul. 5, 2019 (issued as U.S. Pat. No. 10,564,277), U.S. application Ser. No. 16/032,369, filed Jul. 11, 2018 (issued as U.S. Pat. No. 10,509,119), and U.S. application Ser. No. 15/883,372, filed Jan. 30, 2018 (issued as U.S. Pat. No. 10,048,366), appropriate portions of which are incorporated by reference.

The CVAI 130 may be configured to perform the virtual aperture imaging operations for each of the radar frontends 110*a*-110*n*. The CVAI 130 may be configured to expand the dense virtual antenna data from each of the radar frontends 110*a*-110*n* into a centralized dense array of virtual antenna data. Based on the centralized dense array of virtual antenna data, the CVAI 130 may be configured to generate a high resolution of radar detections that may be unable to be determined from the physical antenna data of each of the radar frontends 110*a*-110*n* alone.

The centralized deep sensor fusion module 132 may be configured to receive raw sensor data from multiple sensor data sources. In one example, the centralized deep sensor fusion module 132 may be configured to receive pixel data and/or video frames generated by the camera systems 54*a*-54*n* implemented on the vehicle 50. In another example, the centralized deep sensor fusion module 132 may be configured to receive raw sonar data, raw lidar data, raw ultrasonic data, raw gyroscope data, raw G-force data, etc. The centralized deep sensor fusion module 132 may be configured to evaluate the combination of raw data in order to make decisions based on a rich level of information. The centralized deep sensor fusion module 132 may enable the camera systems 54*a*-54*n* and/or other sensor systems to be implemented at a lower cost because the centralized deep sensor fusion module 132 may perform the data analysis instead of implementing individual ECUs for each sensor. Details of the centralized deep sensor fusion module 132 may be described in association with FIG. 3.

The dynamic resource allocation module 134 may be configured to allocate and/or schedule various resources of the apparatus 100 and/or the vehicle 50. The dynamic resource allocation module 134 may be configured to shift resources depending on what aspects may benefit from additional resources. In an example, the dynamic resource allocation module 134 may determine an amount of processing time for the central processor 120 and/or an amount of capacity of the central memory 122 to assign for various tasks. The dynamic resource allocation module 134 may be configured to analyze upcoming tasks and/or the types of tasks in order to determine how to allocate available resources. Details of the dynamic resource allocation module 134 may be described in association with FIG. 3. The central processor 120 may be configured to generate a signal (e.g., OUT) and/or receive a signal (e.g., REQ). The signal OUT may comprise an output of the centralized processing device 102. The signal OUT may be presented to various components of the vehicle 50. In one example, the signal OUT may comprise the high resolution radar detections. In another example, the signal OUT may comprise inferences and/or decisions made in response to deep sensor fusion operations. In yet another example, the signal OUT may comprise information about resource allocation. In still another example, the signal OUT may comprise information about resource scheduling. In another example, the signal OUT may comprise an egospeed estimation. In yet another example, the signal OUT may comprise a calibrated mounting angle estimation. The signal OUT may be used for various applications (e.g., proximity warnings, driver alerts, driving event logging, etc.).

The signal REQ may comprise a request by an external device and/or resource. The signal REQ may comprise a request for data that may be generated by the central processor 120. In an example, the signal REQ may be a request for video data from an infotainment center. In another example, the signal REQ may be a request for radar detections from a proximity alert system. In still another example, the signal REQ may be a request for traffic information near the vehicle 50 from a smartphone connected to the vehicle 50. The type of data generated and/or received by the central processor 120 may be varied according to the design criteria of a particular implementation.

In the centralized radar architecture with antenna sparsity implemented by the apparatus 100, the raw radar data collected by the various radar heads at the edge sites of the vehicle 50 from the radar frontends 110*a*-110*n* with sparsity may have a low data volume. The low data volume raw radar data LVD_A-LVD_N may be directly streamed over the data network 52 to the central processor 120. The central processor 120 may be configured to perform the CVAI 130 on the sparse raw data LVD_A-LVD_N at a central site (e.g., instead of at each edge site). The CVAI 130 may virtually generate large data cubes, which may deliver high resolutions of radar detections. The radar outputs in the signal OUT may be generated in response to the large data cubes. The radar outputs in the signal OUT may be used for different applications at the central site (e.g., used by the centralized processing device 102 for applications such as the centralized deep sensor fusion 132) and/or for various applications of the vehicle 50 (e.g., for display on an infotainment system of the vehicle 50). Implementing the centralized processing device 102 at a central site instead of having multiple smaller, less powerful processors may enable access to a large amount of the central memory 122, which may be efficiently shared by all radar processing tasks. Furthermore, intermediate ECUs may be eliminated (e.g., a reduction in overall costs).

In the example shown, the apparatus 100 may comprise the centralized processing device 102 and one or more of the radar frontends 110*a*-110*n*. Spatial temporal multi-snapshot (STMS) data integration, ambiguity resolution and/or radar signal processing (e.g., interleaved radar data cube processing) implemented by the apparatus 100 may be performed with any number of the radar frontends 110*a*-110*n*. Generally, any type of the radar frontends 110*a*-110*n* may be implemented with the apparatus 100. Assuming that the radar frontends 110*a*-110*n* may handle any thermal requirements of generating a continuous stream of raw radar data, the centralized processing device 102 may perform the processing. Details of the STMS data integration, ambiguity resolution and/or radar signal processing (e.g., interleaved radar data cube processing) may be described in association with U.S. application Ser. No. 18/140,958 filed on Apr. 28, 2023, appropriate portions of which are incorporated by reference.

The central processor 120 and/or the central memory 122 of the centralized processing device 102 may be configured to perform radar signal processing. The radar signal processing may be performed in a temporal domain and/or spatial domain. The centralized processing device 102 may generate the signal OUT comprising frame output data. The frame output data may comprise a range, Doppler, angle, etc. The frame output data in the output signal OUT may be generated in response to the radar signal processing performed on the radar data cube (e.g., the signals LVD_A-LVD_N).

In some embodiments, the output signal OUT may be generated by the central processor 120 and presented externally (e.g., presented to another device and/or application). In some embodiments, the output signal OUT may be generated by the central processor 120 and used internal to the centralized processing device 102. For example, the output signal OUT may be used internally for centralized deep sensor fusion in combination with computer vision analysis performed by the centralized processing device 102 on the video data generated by the camera systems 54*a*-54*n* and/or other sensor data. In another example, the output signal OUT may be used internally to perform dynamic resource allocation and/or dynamic scheduling of the centralized processing device 102. In yet another example, the output signal OUT may be used internally by the centralized processing device 102 to analyze a radar output mapping of the environment 40. The usage of the output signal OUT may be varied according to the design criteria of a particular implementation. Details of the centralized processing device 102 may be described in association with U.S. application Ser. No. 18/129,834, filed on Apr. 1, 2023, appropriate portions of which are incorporated by reference.

The central processor 120 may be configured to process one of the radar data cubes from the raw radar data during a first time frame and process another one of the radar data cubes from the raw radar data during a second time frame. The central processor 120 may be configured to perform a continuous interleaving of radar data cubes as the raw radar data are received. The central processor 120 may generate the frame output data signal OUT for a first one of the data cubes based on the radar signal processing. The central processor 120 may generate the frame output data signal OUT for a next one of the data cubes based on the continuous interleaving of the radar data cubes.

Each subsequent data cube may be interleaved with the previous data cube. The central processor 120 may utilize an equivalency of the subsequent data cubes from the interleaving to derive the frame output data along with a limited variation between the subsequent data cubes to generate the frame output data signal OUT. The central processor 120 may be configured to generate high resolution radar data based on virtual aperture imaging. The high resolution radar data may provide radar detections. Details of the interleaving of the radar data cubes may be described in association with U.S. application Ser. No. 18/511,719 filed on Nov. 16, 2023, appropriate portions of which are incorporated by reference.

In some embodiments, the apparatus 100 may be configured to resolve the conflict between Doppler resolution and output frame rate (e.g., the resolution of frame output data being proportional to a size of the data cube processed and an output rate of the frame output data being inversely proportional to the size of the data cube processed). The apparatus 100 may be configured to receive a continuous stream of raw radar data from the radar frontends 110*a*-110*n* and interleave the raw radar data between subsequent data cubes. Interleaving the raw radar data in the data cubes may provide continuous multi-look angle diversity. There may be limited variability between the subsequent data cubes, which may provide a coherency between each data cube. In the phase domain, the different segments of each data cube may be acquired from the continuous stream of the raw radar data in order to be coherent. By implementing the centralized processing device 102 to receive the continuous stream of the raw radar data LVD_A-LVD_N, each data cube processed may be coherent. Details of receiving and/or processing the continuous stream of raw radar data and/or interleaving the raw radar data may be described in association with U.S. patent application Ser. No. 18/140,958, file on Apr. 28, 2023, appropriate portions of which are incorporated by reference.

Figure 3:
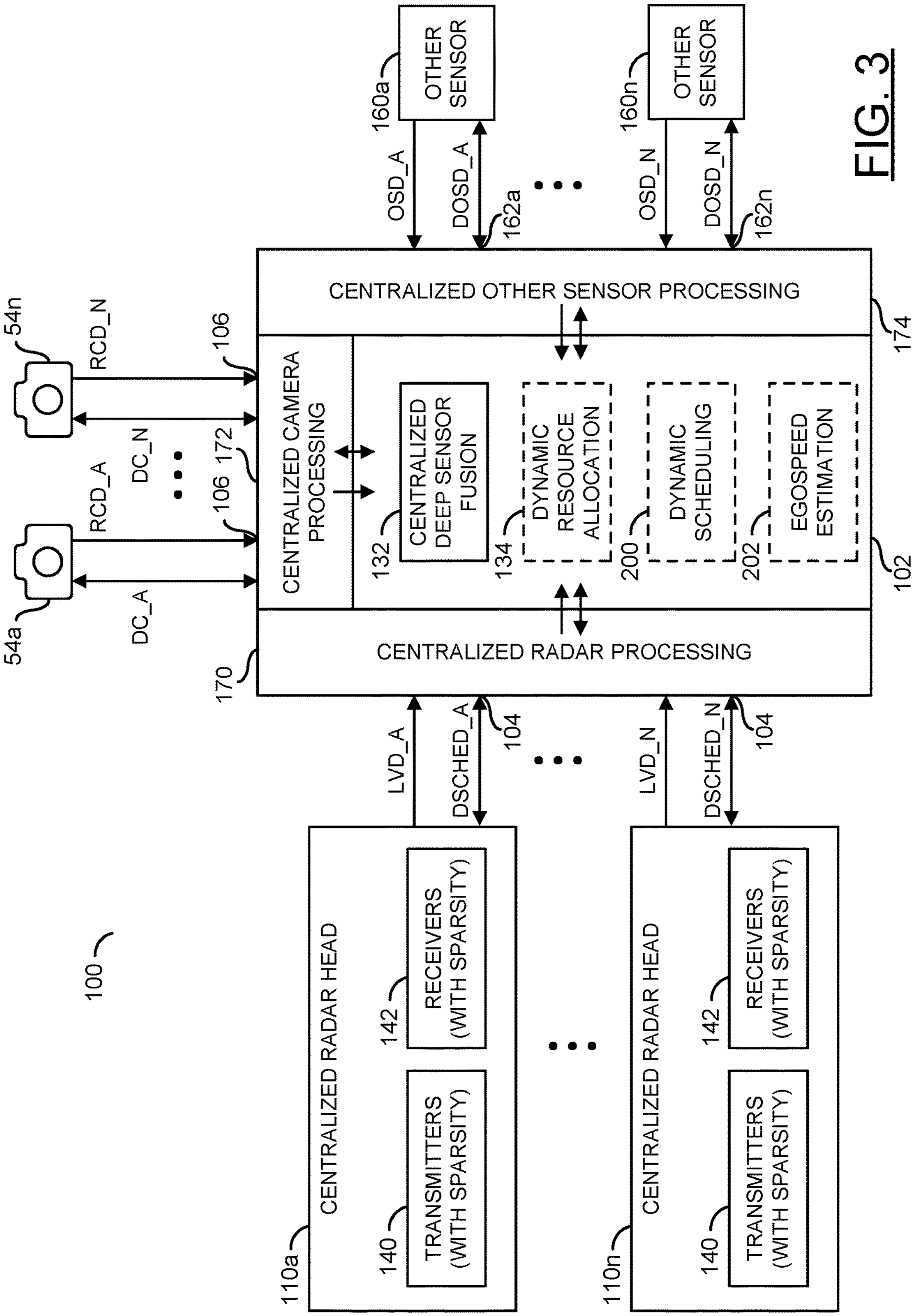
FIG. 3 is a block diagram illustrating an example embodiment of the present invention implementing egospeed estimation.

Referring to FIG. 3, a block diagram illustrating an example embodiment of the present invention implementing egospeed estimation is shown. The apparatus 100 is shown comprising the radar frontends 110*a*-110*n* and the centralized processing device 102. In the example shown, the radar frontends 110*a*-110*n* may implement the transmitters 140 with sparsity and the receivers 142 with sparsity. The radar frontends 110*a*-110*n* may each generate the low volume raw radar data LVD_A-LVD_N. The raw radar data LVD_A-LVD_N may be received by the centralized processing device 102 at the radar data interface 104.

The apparatus 100 and/or the vehicle 50 may comprise the camera systems 54*a*-54*n* and/or blocks (or circuits) 160*a*-160*n*. The circuits 160*a*-160*n* may comprise other types of sensors. In one example, the other types of sensors 160*a*-160*n* may comprise sonar sensors. In another example, the other types of sensors 160*a*-160*n* may comprise lidar sensors. In yet another example, the other types of sensors 160*a*-160*n* may comprise ultrasonic sensors. In still another example, the other types of sensors 160*a*-160*n* may comprise gyroscopes, G-force sensors, accelerometers, microphones, etc. The number and/or type of the other sensors 160*a*-160*n* implemented may be varied according to the design criteria of a particular implementation.

Each of the camera systems 54*a*-54*n* may be configured to generate a respective signal (e.g., RCD_A-RCD_N). The signals RCD_A-RCD_N may comprise raw camera data. In an example, the raw camera data signals RCD_A-RCD_N may provide pixel data. For example, each of the camera systems 54*a*-54*n* may generate pixel data of the environment 40 within the respective fields of view 64*a*-64*n*. The signals RCD_A-RCD_N may be communicated over the data network 52. The raw camera data RCD_A-RCD_N may be received by the centralized processing device 102 at the video data interface 106.

Each of the other types of sensors 160*a*-160*n* may be configured to generate a respective signal (e.g., OSD_A-OSD_N). The signals OSD_A-OSD_N may comprise raw sensor data. The type of raw sensor data provided in the signals OSD_A-OSD_N may depend on the type of sensors implemented. In an example, one or more of the raw sensor data signals OSD_A-OSD_N may provide lidar data. In another example, one or more of the raw sensor data signals OSD_A-OSD_N may provide acceleration information. In yet another example, one or more of the raw sensor data signals OSD_A-OSD_N may provide traffic information (e.g., received from a third party source of traffic data). For example, each of the other sensor types 160*a*-160*n* may generate raw sensor data about the environment 40 based on the information acquired by the sensor. The signals OSD_A-OSD_N may be communicated over the data network 52.

The centralized processing device 102 may implement one or more sensor data interfaces 162*a*-162*n*. In some embodiments, the centralized processing device 102 may comprise one of the sensor data interfaces 162*a*-162*n* for each type of the other sensors 160*a*-160*n*. In some embodiments, the centralized processing device 102 may comprise one sensor data interface (e.g., 162*a*) for all of the other sensors 160*a*-160*n*. In some embodiments, the radar data interface 104, the video data interface 106 and/or the sensor data interfaces 162*a*-162*n* may be the same interface. The sensor data OSD_A-OSD_N may be received by the centralized processing device 102 from the data network 52 at the sensor data interfaces 162*a*-162*n*.

The centralized processing device 102 may implement the centralized deep sensor fusion module 132, the dynamic resource allocation module 134, a block (or circuit) 170, a block (or circuit) 172, a block (or circuit) 174, a block (or circuit) 200 and/or a block (or circuit) 202. The circuit 170 may implement centralized radar processing. The circuit 172 may implement centralized camera processing. The circuit 174 may implement centralized sensor processing. The circuit 200 may implement a dynamic scheduling module. The circuit 202 may implement an egospeed estimation module. In some embodiments, the circuits 170-174 and/or the circuits 200-202 may comprise co-processors, dedicated cores of the central processor 120 and/or distinct (e.g., dedicated) hardware modules. In some embodiments, the circuits 170-174 and/or the circuits 200-202 may be implemented on a same silicon as the central processor 120. In some embodiments, the circuits 170-174 and/or the circuits 200-202 may be implemented in response to the central processor 120 and/or the central memory 122 allocating resources to programmable hardware engines and/or selecting the programmable hardware engines for particular tasks. The architecture of the centralized processing device 102 may make the dynamical resources allocation and/or dynamical sensor scheduling possible.

The centralized radar processing 170 may be configured to perform various operations on the raw radar data LVD_A-LVD_N. The centralized radar processing 170 may be configured to implement the CVAI 130. The centralized radar processing 170 may be configured to generate the large data cubes and/or generate the high resolution radar detections. The centralized radar processing 170 may be configured to combine and/or evaluate the continuous stream of data presented by each of the radar frontends 110*a*-110*n*.

The centralized camera processing 172 may be configured to perform various operations on the raw camera data RCD_A-RCD_N. In an example, the centralized camera processing 172 may be configured to process the pixel data in the raw camera data RCD_A-RCD_N as video frames. The centralized camera processing 172 may be configured to generate high resolution video output (e.g., 1080p, 4k, 8k video, etc.) at various framerates (e.g., 15 fps, fps, 60 fps, etc.). The centralized camera processing 172 may be configured to implement various video compression techniques. The centralized camera processing 172 may be configured to perform computer vision operations. In an example, the central memory 122 may be configured to store various feature sets and/or detection libraries, and the centralized camera processing 172 may be configured to implement an artificial neural network (ANN) to detect objects. In an example, the centralized camera processing may implement a convolutional neural network configured to detect objects and/or determine characteristics and behaviors of the detected objects. Details of the hardware and/or the object detection performed by the centralized camera processing 172 may be described in association with U.S. patent application Ser. No. 16/831,549, filed on Apr. 16, 2020 (now U.S. Pat. No. 11,586,843), U.S. patent application Ser. No. 16/288,922, filed on Feb. 28, 2019 (now U.S. Pat. No. 11,001,231), U.S. patent application Ser. No. 15/593,463, filed on May 12, 2017 (now U.S. Pat. No. 10,437,600), U.S. patent application Ser. No. 15/931,942, filed on May 14, 2020 (now U.S. Pat. No. 11,645,706), U.S. patent application Ser. No. 16/991,344, filed on Aug. 12, 2020 (now U.S. Pat. No. 12,374,107), U.S. patent application Ser. No. 17/479,034, filed on Sep. 20, 2021 (now U.S. Pat. No. 12,002,229), and U.S. patent application Ser. No. 15/403,540, filed on Jan. 11, 2017 (now U.S. Pat. No. 10,310,768), appropriate portions of which are incorporated by reference. The centralized camera processing 172 may be configured to combine and/or evaluate the continuous stream of raw pixel data presented by each of the camera systems 54*a*-54*n*.

The centralized sensor processing 174 may be configured to perform various operations on the raw sensor data OSD_A-OSD_N. The centralized sensor processing 174 may be configured to perform analysis and/or operations on the raw sensor data OSD_A-OSD_N. The type of analysis and/or operations performed may depend on the types of the other sensors 160*a*-160*n* implemented. The centralized sensor processing 174 may be configured to perform the analysis of the raw sensor data OSD_A-OSD_N at one central location (or at a zone location), instead of implementing multiple ECUs for each of the other sensors 160*a*-160*n*. In one example, the centralized sensor processing 174 may receive raw lidar data from a lidar sensor and determine whether an object is within a predefined proximity of the vehicle 50. In another example, the centralized sensor processing 174 may receive G-force information from a G-force sensor and analyze the amount of force and/or direction of force to determine whether the data corresponds to an impact. In yet another example, the centralized sensor processing 174 may receive a fluid level reading from a sensor measuring washer fluid and then determine whether the amount of fluid is below a predefined level. The types of operations and/or measurements performed by the centralized sensor processing 174 may be varied according to the design criteria of a particular implementation. The centralized sensor processing 174 may be configured to combine and/or evaluate the continuous stream of raw data presented by each of the other sensors 160*a*-160*n*.

The centralized processing device 102 may be configured to implement the centralized deep sensor fusion module 132. The centralized deep sensor fusion module 132 may be configured to receive a stream of all of the raw data in order to receive a rich information level. For example, all of the sensor data (e.g., radar, camera, accelerometer, lidar, sonar, etc.) may be processed by the central processor 120 using the centralized deep sensor fusion module 132. In an example, the centralized radar processing 170 may forward the raw radar data LVD_A-LVD_N and/or present the high resolution data, the large data cubes, radar detections, etc. to the centralized deep sensor fusion module 132. In another example, the centralized camera processing 172 may forward the raw camera data RCD_A-RCD_N and/or present the video frames, the detected objects, the object locations, the object characteristics, etc. to the centralized deep sensor fusion module 132. In yet another example, the centralized sensor processing 174 may forward the raw sensor data OSD_A-OSD_N and/or present various measurements and/or detections based on the sensor data to the centralized deep sensor fusion module 132.

The centralized deep sensor fusion module 132 may be configured to analyze the disparate sources of information together. For example, the centralized deep sensor fusion module 132 may combine and/or evaluate all the raw data and/or detections in order to determine inferences that may not be available based on a single one of the data sources alone. Using the rich level of information available from all the sensors of the vehicle 50, the centralized deep sensor fusion module 132 may understand a context for the information about the environment 40 gathered by the radar frontends 110*a*-110*e*, the camera systems 54*a*-54*n* and/or the other sensors 160*a*-160*n*.

In an example, the other sensor 160*a* may provide a fluid level of washer fluid in the vehicle 50 and the centralized sensor processing 174 may determine that the washer fluid level is low, and the camera system 54*a* implementing the field of view 64*a* behind the vehicle 50 may capture video frames and the centralized camera processing 172 may detect a fluid behind the vehicle. Using only the centralized sensor processing 174, a low fluid level warning may be generated. However, using the centralized deep sensor fusion module 132 to combine the information about the low fluid level (e.g., determined by the centralized sensor processing 174) and the fluid dripping behind the vehicle 50 (e.g., determined by the centralized camera processing 172) together, the centralized deep sensor fusion module 132 may determine that the washer fluid tank of the vehicle 50 may have a leak.

In another example, the radar frontend 110*a* may provide raw radar data and the centralized radar processing 170 may provide a distance measurement to an object in front of the vehicle 50, and the G-force sensor 160*b* may provide a direction and amount of force and the centralized sensor processing 174 may determine the vehicle 50 has stopped. Using only the centralized sensor processing 174, a reason for stopping the vehicle 50 may be unknown. However, using the centralized deep sensor fusion module 132 to combine information about the vehicle 50 stopping (e.g., determined by the centralized sensor processing 174) and the distance measurement of an object (e.g., determined by the centralized radar processing 170) together, the centralized deep sensor fusion module 132 may determine that the driver intentionally stopped the vehicle 50 because of a nearby object.

In yet another example, the combination of distance measurements to objects provided by the centralized radar processing 170, the classification of the objects provided by the centralized camera processing 172 and/or the distance information from lidar in foggy conditions provided by the centralized sensor processing 174 may be analyzed together by the centralized deep sensor fusion module 132 in order to determine a detailed mapping of all the objects (including object types, object locations, behavior of objects) in the environment 40 in a 360 degree view around the vehicle 50 that may be available in all weather conditions. The types of inferences that the centralized deep sensor fusion module 132 may determine may be varied according to the design criteria of a particular implementation.

Implementing the radar frontends 110*a*-110*n* with sparsity may break a fundamental trade off in radar processing of needing more antennas to get higher resolution. Leveraging sparsity in the design may enable the overall data cube to reduce the number of physical samples that may be needed for reconstructing high resolution detections.

The dynamic resource allocation module 134 may be configured to determine an amount of resources to enable for particular devices. In an example, the dynamic resource allocation module 134 may be configured to assign, reserve and/or allocate compute resources, memory resources, bandwidth (e.g., within the centralized processing device 102 and/or on the data network 52), etc. The resources allocated to each device by the dynamic resource allocation module 134 may be determined in response to particular application tasks that may be performed and/or the environment 40. In some embodiments, the dynamic resource allocation module 134 may receive the upcoming applications task from the central processor 120 and/or the central memory 122. In some embodiments, the dynamic resource allocation module 134 may determine the upcoming application tasks and/or information about the environment 40 based on the decisions made by the centralized deep sensor fusion module 132. In some embodiments, the dynamic resource allocation module 134 may determine the upcoming application tasks and/or information about the environment 40 based on the detections determined by the centralized radar processing 170, the centralized camera processing 172 and/or the centralized sensor processing 174. In some embodiments, the dynamic resource allocation module 134 may determine the upcoming application tasks from the signal REQ. The method of determining the upcoming application tasks, details about the environment 40 and/or the amount of resources to allocate for each device may be varied according to the design criteria of a particular implementation.

In some embodiments, the dynamic resource allocation module 134 may disable access to resources for particular devices in order to save power. In an example, in clear conditions (e.g., sunny, no fog, no rain) data from the camera systems 54*a*-54 and/or the radar frontends 110*a*-110*n* may be sufficient for the centralized processing device 102 to detect objects around the vehicle 50. For example, to save power, the other sensor 160*a* implementing lidar may be disabled by the dynamic resource allocation module 134. In another example, in foggy conditions, visibility using the camera systems 54*a*-54*n* may be low but the other sensor 160*a* implementing the lidar may provide distance and/or object information. In response to detecting the foggy conditions, the dynamic resource allocation module 134 may disable the centralized camera processing 172 and enable the other sensor 160*a* implementing the lidar. In yet another example, a user may select a higher resolution format (e.g., 4k video) for the camera systems 54*a*-54*n*, which may cause the raw camera data signals RCD_A-RCD_N to occupy a large proportion of the bandwidth available on the data network 52. In order to accommodate the higher bandwidth used by the camera systems 54*a*-54*n*, the dynamic resource allocation module 134 may reduce a data update frequency of the radar frontends 110*a*-110*n* and/or the other sensors 160*a*-160*n*. The dynamic resource allocation module 134 may further allocate more of the computer resources of the central processor 120 and/or allocate more of the central memory 122 to performing the centralized camera processing 172 and/or reduce the allocation of the central processor 120 and/or the central memory 122 for the centralized radar processing 170 and/or the centralized sensor processing 174.

The dynamic scheduling module 200 may be configured to schedule the various devices of the apparatus 100 and/or the vehicle 50. In an example, the scheduling performed by the dynamic scheduling module 200 may comprise adjusting when to turn on sensors, a scope of the sensors, the data volume to be streamed by the sensors, etc. in real-time. The dynamic scheduling module 200 may work together with the dynamic resource allocation module 134. For example, the dynamic scheduling module 200 may determine the scheduling for the radar frontends 110*a*-110*n*, the camera systems 54*a*-54*n* and/or the other sensors 160*a*-160*n* in response to the resource allocation performed by the dynamic resource allocation module 134.

The centralized processing device 102 may be configured to communicate signals (e.g., DSCHED_A-DSCHED_N) between the radar frontends 110*a*-110*n*. Each of the signals DSCHED_A-DSCHED_N may be communicated to a respective one of the radar frontends 110*a*-110*n* via the radar data interface 104. The centralized processing device 102 may be configured to communicate signals (e.g., DC_A-DC_N) between the camera systems 54*a*-54*n*. Each of the signals DC_A-DC_N may be communicated to a respective one of the camera systems 54*a*-54*n* via the video data interface 106. The centralized processing device 102 may be configured to communicate signals (e.g., DOSD_A-DOSD_N) between the other sensors 160*a*-160*n*. Each of the signals DOSD_A-DOSD_N may be communicated to a respective one of the other sensors 160*a*-160*n* via the sensor data interfaces 162*a*-162*n*.

The signals DSCHED_A-DSCHED_N may be generated by the dynamic scheduling module 200 in order to schedule the radar frontends 110*a*-110*n*. In an example, the signals DSCHED_A-DSCHED_N may be generated by the radar frontends 110*a*-110*n* in order to provide the dynamic scheduling module 200 operating statistics of the radar frontends 110*a*-110*n* (e.g., detection frequency, on/off status, data rate, etc.). In another example, the signals DSCHED_A-DSCHED_N may be generated by the dynamic scheduling module 200 in order to schedule and/or select modes of operations for the radar frontends 110*a*-110*n* (e.g., turn on/off, increase/decrease detection frequency, increase/decrease data rate, etc.).

The signals DC_A-DC_N may be generated by the dynamic scheduling module 200 in order to schedule the camera systems 54*a*-54*n*. In an example, the signals DC_A-DC_N may be generated by the camera systems 54*a*-54*n* in order to provide the dynamic scheduling module 200 operating statistics of the camera systems 54*a*-54*n* (e.g., frame rate, on/off status, resolution, etc.). In another example, the signals DC_A-DC_N may be generated by the dynamic scheduling module 200 in order to schedule and/or select modes of operations for the camera systems 54*a*-54*n* (e.g., turn on/off, increase/decrease resolution, increase/decrease frame rate, etc.).

The signals DOSD_A-DOSD_N may be generated by the dynamic scheduling module 200 in order to schedule the other sensors 160*a*-160*n*. In an example, the signals DOSD_A-DOSD_N may be generated by the other sensors 160*a*-160*n* in order to provide the dynamic scheduling module 200 operating statistics of the other sensors 160*a*-160*n* (e.g., type of data collected, on/off status, data acquisition rate, data volume per acquisition, etc.). In another example, the signals DOSD_A-DOSD_N may be generated by the dynamic scheduling module 200 in order to schedule and/or select modes of operations for the other sensors 160*a*-160*n* (e.g., turn on/off, increase/decrease data acquisition rate, increase/decrease data volume per acquisition, etc.).

In an example, if the camera system 54*c* fails, the dynamic scheduling module 200 may determine that the camera system 54*c* is unavailable via the signal DC_C, and the dynamic scheduling module 200 may present the signal DC_D to the camera system 54*d* in order to enable the camera system 54*d* to use a wider field of view 64*d* to compensate for the missing data from the field of view 64*c*. In response to the wider field of view 64*d*, the dynamic resource allocation module 134 may allocate additional resources to the centralized camera processing 172 to support the additional dewarping that may need to be performed on the wider angle video frames generated by the camera system 54*d*. In another example, in low visibility conditions, the dynamic scheduling module 200 may increase a data acquisition rate for the radar frontends 110*a*-110*n* via the signals DSCHED_A-DSCHED_N and/or decrease a frame rate for the camera systems 54*a*-54*n* via the signals DC_A-DC_N. The particular types of scheduling performed by the dynamic scheduling module 200 may be varied according to the design criteria of a particular implementation.

The egospeed estimation module 202 may be configured to generate an egospeed estimation of the host vehicle 50 and/or perform automatic calibration for the radar frontends 110*a*-110*n*. The egospeed estimation module 202 may be configured to perform Doppler peaking techniques to estimate the egospeed from the detections in the signals LVD_A-LVD_N. In some embodiments, the Doppler peaking techniques may be performed with Doppler measurement ambiguity. In some embodiments, the Doppler peaking techniques may be performed without Doppler measurement ambiguity. The egospeed estimation module 202 may be configured to implement the auto-calibration to ensure consistency between different radar frontends 110*a*-110*n* and/or an accuracy of the egospeed estimation. Details of the egospeed estimation and/or the auto-calibration performed by the egospeed estimation module 202 may be described in association with FIGS. 4-12.

The centralized processing device 102 may be configured to perform the operations of a control unit (e.g., an electronic control unit (ECU)). The centralized processing device 102 may be configured to implement egospeed estimation (e.g., implemented by the egospeed estimation module 202). The centralized processing device 102 may be configured to control, perform dynamic resource allocation and/or dynamic task scheduling for the radar frontends 110*a*-110*n*, the camera systems 54*a*-54*n* and/or the other sensors 160*a*-160*n* (e.g., implemented by the dynamic resource allocation module 134 and/or the dynamic scheduling module 200). The centralized processing device 102 may be configured to implement sensor fusion (e.g., implemented by the centralized deep sensor fusion module 132). The centralized processing device 102 may receive data via the data network 52 to provide a central data storage and/or processing hub.

Figure 4:
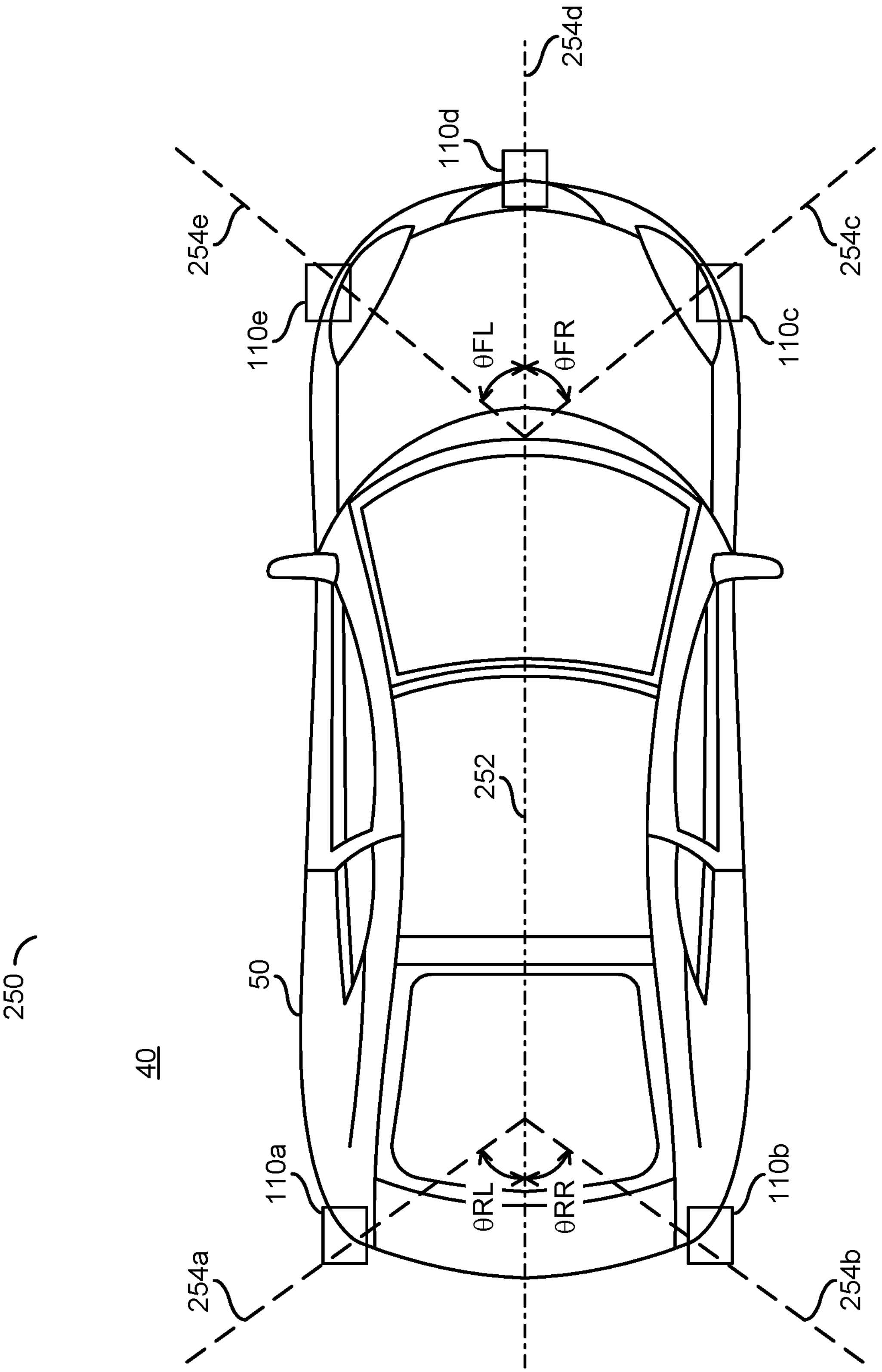
FIG. 4 is a diagram illustrating mounting angles of multiple radar devices on a host vehicle.

Referring to FIG. 4, a diagram illustrating mounting angles of multiple radar devices on a host vehicle is shown. A top-down view 250 of the host vehicle 50 in the environment 40 is shown. The top-down view 250 may comprise an illustrative example of a 360° radar system. The top-down view 250 of the 360° radar system shown may comprise the radar frontends 110*a*-110*e*.

In the example shown, the top-down view 250 of the 360° radar system may be implemented with five of the radar frontends 110*a*-110*n*, each with a different mounting angle. The radar frontend 110*a* may implement a rear left (RL) radar, the radar frontend 110*b* may implement a rear right (RR) radar, the radar frontend 110*c* may implement a front right (FR) radar, the radar frontend 110*d* may implement a front center (FC) radar and the radar frontend 110*e* may implement a front left (FL) radar. In some embodiments, the 360° radar system may be implemented using six of the radar frontends 110*a*-110*n*. Generally, the 360° radar system may be implemented with five or six of the radar frontends 110*a*-110*n* mounted at edge locations on the host vehicle 50 to provide surround (or all-around) observations.

In some embodiments, more or fewer of the radar frontends 110*a*-110*n* may be implemented. In some embodiments, a wide FOV may be captured of the environment 40 near the host vehicle 50 that may be less than the 360° FOV. Generally, the system 100 may be configured to capture static detections from multiple different angles. Implementing the radar frontends 110*a*-110*n* at various edge sites on the host vehicle 50 may enable the wide angle FOV to capture target detections in the environment 40 even when one of the radar frontends 110*a*-110*n* is physically blocked. For example, blocking a few of the radar frontends 110*a*-110*n* may not prevent calculating an estimation of the egospeed. The detection of static targets in the environment 40 from multiple different angles may provide a sufficient number of data points that may ensure a reliability and accuracy of the egospeed estimation. To ensure accuracy, the angles of the radar frontends 110-110*n* may be auto-calibrated by the egospeed estimation module 202.

A centerline 252 is shown on the host vehicle 50. The centerline 252 may bisect the host vehicle 50 lengthwise (e.g., bisect the left and right (e.g., passenger and driver) side of the host vehicle 50). In some embodiments, the centerline 252 may be a reference line for a mounting angle of the radar frontends 110*a*-110*n*.

Dashed lines 254*a*-254*e* are shown. The dashed lines 254*a*-254*e* may each extend from the centerline 252. The dashed lines 254*a*-254*e* may each represent an ideal mounting direction for a respective one of the radar frontends 110*a*-110*n*. The egospeed estimation module 202 may be configured to automatically calibrate the ideal mounting directions 254*a*-254*e* for each of the radar frontends 110*a*-110*e*. Similarly, in embodiments of the host vehicle 50 with more than the five radar frontends 110*a*-110*e* implemented, the egospeed estimation module 202 may be configured to auto-calibrate the ideal mounting directions 254*a*-254*n* (e.g., determine a true mounting angle) for each of the radar frontends 110*a*-110*n*.

An angle (e.g., ΘRL), an angle (e.g., ORR), an angle (e.g., OFR) and an angle (e.g., ΘFL) are shown. The angle ΘRL is shown from the centerline 252 to the ideal mounting direction 254*a* for the radar frontend 110*a*. The angle ΘRR is shown from the centerline 252 to the ideal mounting direction 254*b* for the radar frontend 110*b*. The angle ΘFR is shown from the centerline 252 to the ideal mounting direction 254*c* for the radar frontend 110*c*. The angle ΘFL is shown from the centerline 252 to the ideal mounting direction 254*e* for the radar frontend 110*e*. The ideal mounting direction 254*d* for the front center radar frontend 110*d* may be coincident with the centerline 252. For example, the angles ΘRL, ORR, ORF, ΘFL and/or the ideal mounting direction 254*d* may be an estimated true angle for the respective radar frontends 110*a*-110*e* that may be calculated by the egospeed estimation module 202.

In some embodiments, the radar frontends 110*a*-110*n* may be mounted on the host vehicle 50 accurately at the estimated true angles (e.g., an optimal mounting angle for providing accurate egospeed estimation). In some scenarios, the radar frontends 110*a*-110*n* may not be mounted at the estimated true angles. For example, one or more of the radar frontends 110*a*-110*n* may have been installed incorrectly during manufacturing of the host vehicle 50. In another example, an angle of the radar frontends 110*a*-110*n* may drift over time. The auto-calibration implemented by the egospeed estimation module 202 may be configured to determine the amount of error (e.g., a difference from a current mounting orientation and/or angle) and the estimated true angles for each of the radar frontends 110*a*-110*n*. In one example, in response to determining the estimated true angles, the radar detection data generated by the radar frontends 110*a*-110*n* may be corrected (e.g., cosine correction) and/or compensated. In another example, in response to determining the estimated true angles, the radar frontends 110*a*-110*n* may be corrected manually and/or automatically.

The auto-calibration correction may be configured to correct radar mounting angle errors. The radar mounting angle errors may result in uncertainty in measurements by the radar frontends 110*a*-110*n*, which may cascade into errors in the calculations by the centralized processing device 102. The auto-calibration correction may be configured to correct a radar mounting angle error by searching for the estimated true angles. The estimated true angles may be determined based on an angle that produces a highest histogram peak of static radar detections. In an example, the egospeed estimation module 202 may be configured to analyze a histogram comprising angle bins to determine the peak Doppler detections value. The histogram of angle bins may provide a distribution radar target detections across angles within the field of view of one of the radar frontends 110*a*-110*n*. Each angle bin may provide a segment (or bin) based on a frequency and/or density of detections at a particular angle. The angle bins may enable a spatial distribution of radar detections across the viewing angle range. The peak of the histogram of the angle bins may provide the angle that may comprise the highest density of detections of static objects. The size of each of the angle bins may be selected by accounting for accuracy and/or computational resources. In an example, higher accuracy (e.g., small sized angle bins) may result in usage of more computational resources. Generally, the egospeed estimation module 202 may calculate histograms with angle bins to determine a highest density of detections for the estimated true angle while performing auto-calibration and calculate histograms with Doppler speed bins to determine a highest number of detections to estimate the egospeed.

Figure 5:
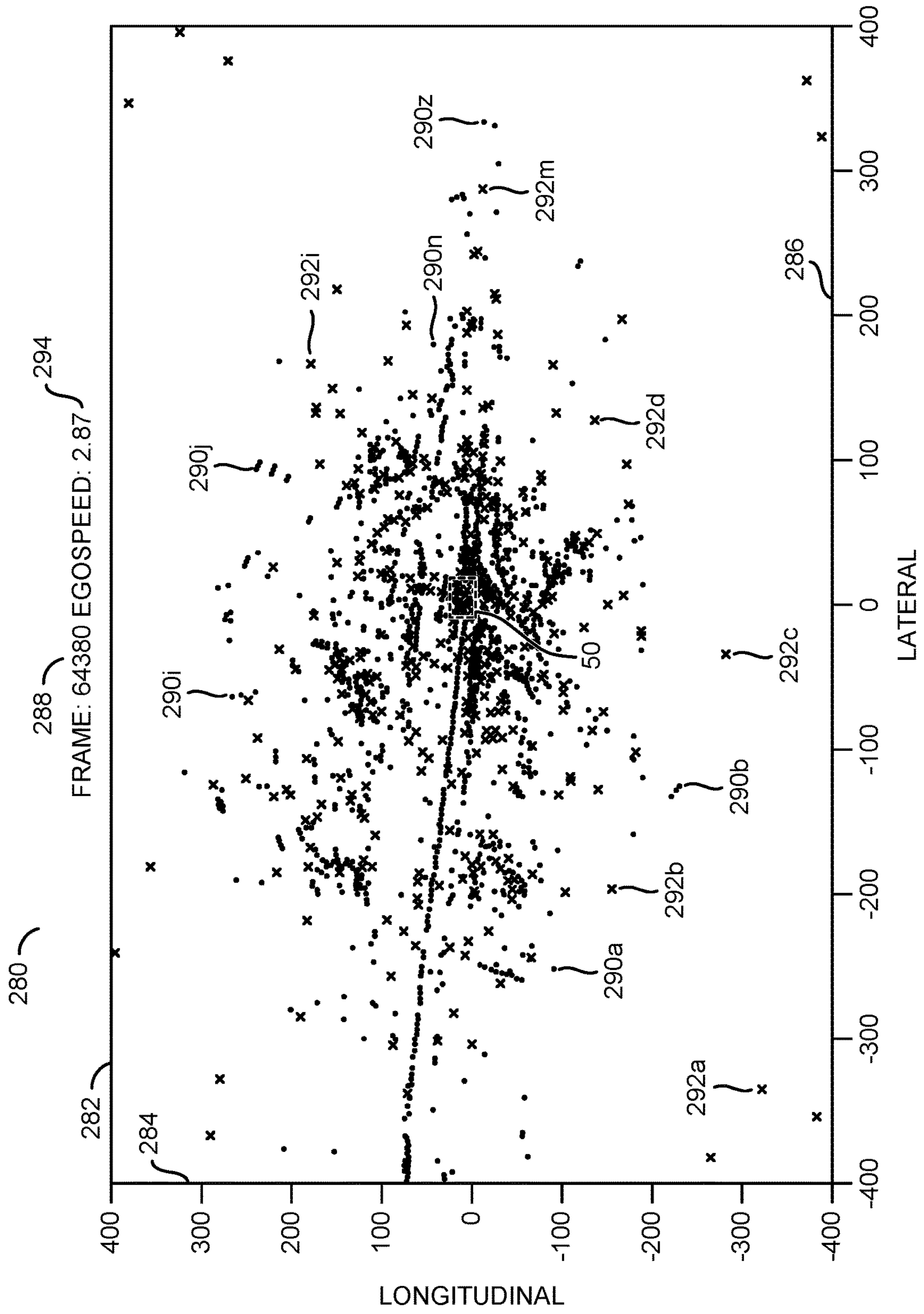
FIG. 5 is a diagram illustrating a plot of static detections and moving object detections in an environment within radar range of a host vehicle.

Referring to FIG. 5, a diagram illustrating a plot of static detections and moving object detections in an environment within radar range of a host vehicle is shown. A scatter plot 280 is shown. The scatter plot 280 may represent detections made by the radar frontends 110*a*-110*n*. In the example shown, the host vehicle 50 implementing the radar frontends 110*a*-110*n* and the centralized processing device 102 may be located at a center of the scatter plot 280.

The scatter plot 280 may comprise an axis 284, an axis 286 and/or a title 288. The axis 284 may be a Y axis of the scatter plot 280. The Y axis 284 may represent longitudinal values. The X axis 286 may represent lateral values. The Y axis 284 and the X axis 286 may represent distance measurements. For example, the Y axis 284 and the X axis 286 may each illustrate distance measurements in meters from −400 m to 400 m. The title 288 of the scatter plot 280 may be a frame number (e.g., a frame number of a high resolution radar output frame). In the example shown, the title 288 may be frame number 64380. The frame number 64380 may be a representative example of a radar output frame generated by the centralized processing device 102.

The scatter plot 280 may represent radar detections of objects detected by the radar frontends 110*a*-110*n* in the environment 40. The host vehicle 50 may be located at point 0,0 (e.g., an origin point and/or reference location) of the scatter plot 280. Various object detections (e.g., radar target detections) may be shown on the scatter plot 280. In the example shown, the radar detections may be captured from a 360° radar system.

The scatter plot 280 may comprise a number of radar detections 290*a*-290*z* and a number of radar detections 292*a*-292*m*. The radar detections 290*a*-290*z* may each be illustrated as a dot on the scatter plot 280. The radar detections 290*a*-290*z* may represent static objects detected. The radar detections 292*a*-292*m* may be illustrated as an X on the scatter plot 280. The radar detections 292*a*-292*m* may represent moving object detections (or noise). Generally, there may be many more of the static object detections 290*a*-290*z* detected in the environment 40 than the moving object detections 292*a*-292*m*. For illustrative purposes, a subset of the dots representing the static object detections 290*a*-290*z* and/or a subset of the Xs representing the moving object detections 292*a*-292*m* may be labeled. However, there may be hundreds (or thousands) of each type of object detected. The number of the static object detections 290*a*-290*z* and/or the number of moving object detections 292*a*-292*m* may be varied according to a particular environment, a particular driving scenario, the mounting angles of the radar frontends 110*a*-110*n*, the resolution output of the centralized processing device 102 and/or the design criteria of a particular implementation.

Generally, the majority of radar detections in the environment 40 may be static object detections 290*a*-290*z*. For example, the static object detections 290*a*-290*z* may correspond to the probe signals TX_A-TX_N reflecting off of road edges, buildings, barriers, trees, street signs, lamps, etc. and being received as the reflected signals RX_A-RX_N. The static object detections 290*a*-290*z* may be detectable in various environments (e.g., high building density cities, tunnels, parking garages, open roads, covered roads, etc.). For example, the capability of the apparatus 100 detecting the static object detections 290*a*-290*z* in various environments may enable the egospeed to be estimated in locations that GPS/GNSS may be unavailable. Relying on the static object detections 290*a*-290*z* may enable the egospeed estimation module 202 to implement a robust system for estimating the egospeed of the host vehicle 50. The particular types of objects in the environment 40 that correspond to the static object detections 290*a*-290*z* may be varied according to the design criteria of a particular implementation.

The egospeed estimation module 202 may be configured to determine the egospeed estimation in response to analyzing the distance and/or Doppler measurements that correspond to the static object detections 290*a*-290*z*. For example, the moving object detections (or noise) 292*a*-290*m* may be ignored (e.g., filtered out). The egospeed may be retrieved from the distance and/or Doppler measurements of the static object detections 290*a*-290*z* by searching a histogram peak with automatic mounting angle calibration. For example, the histogram peak may be determined in response to a histogram of Dopplers.

The system 100 may be configured to receive measurements from the static object detections 290*a*-290*z* in the environment 40. In the example shown, the static object detections 290*a*-290*z* (and the moving object detections 292*a*-292*m*) may comprise objects surrounding the host vehicle 50. Each of the static object detections 290*a*-290*z* and the moving object detections 292*a*-292*m* are shown at a distance with respect to the origin (e.g., 0,0 where the vehicle 50 is located). In some embodiments, when the FOV of the radar frontends 110*a*-110*n* provides less than the 360° field of view, the static object detections 290*a*-290*z* (and the moving object detections 292*a*-292*m*) may comprise objects near the host vehicle 50. The radar detection devices 110*a*-110*n* may be configured to capture a large volume of the static object detections 290*a*-290*z*. While the radar frontends 110*a*-110*n* may capture both the static object detections 290*a*-290*z* and/or the moving object detections 292*a*-292*m*, the egospeed estimation module 202 filter out the moving object detections 292*a*-292*m* and rely on the measurements from the static object detections 290*a*-290*z* for the egospeed estimation. In one example, the number of the static object detections 290*a*-290*z* may be approximately a thousand detections. In another example, the number of the static object detections 290*a*-290*z* may be approximately a couple of thousand detections. In yet another example, the number of the static object detections 290*a*-290*z* may be approximately tens of thousands of detections. The number of the static object detections 290*a*-290*z* in the environment 40 may be varied according to the environmental context and/or the design criteria of a particular implementation.

The system 100 may be configured to estimate the egospeed of the host vehicle 50. An egospeed estimation 294 for the scatter plot 280 is shown. In the example shown, the egospeed estimation 294 may be 2.87 m/s.

Figure 6:
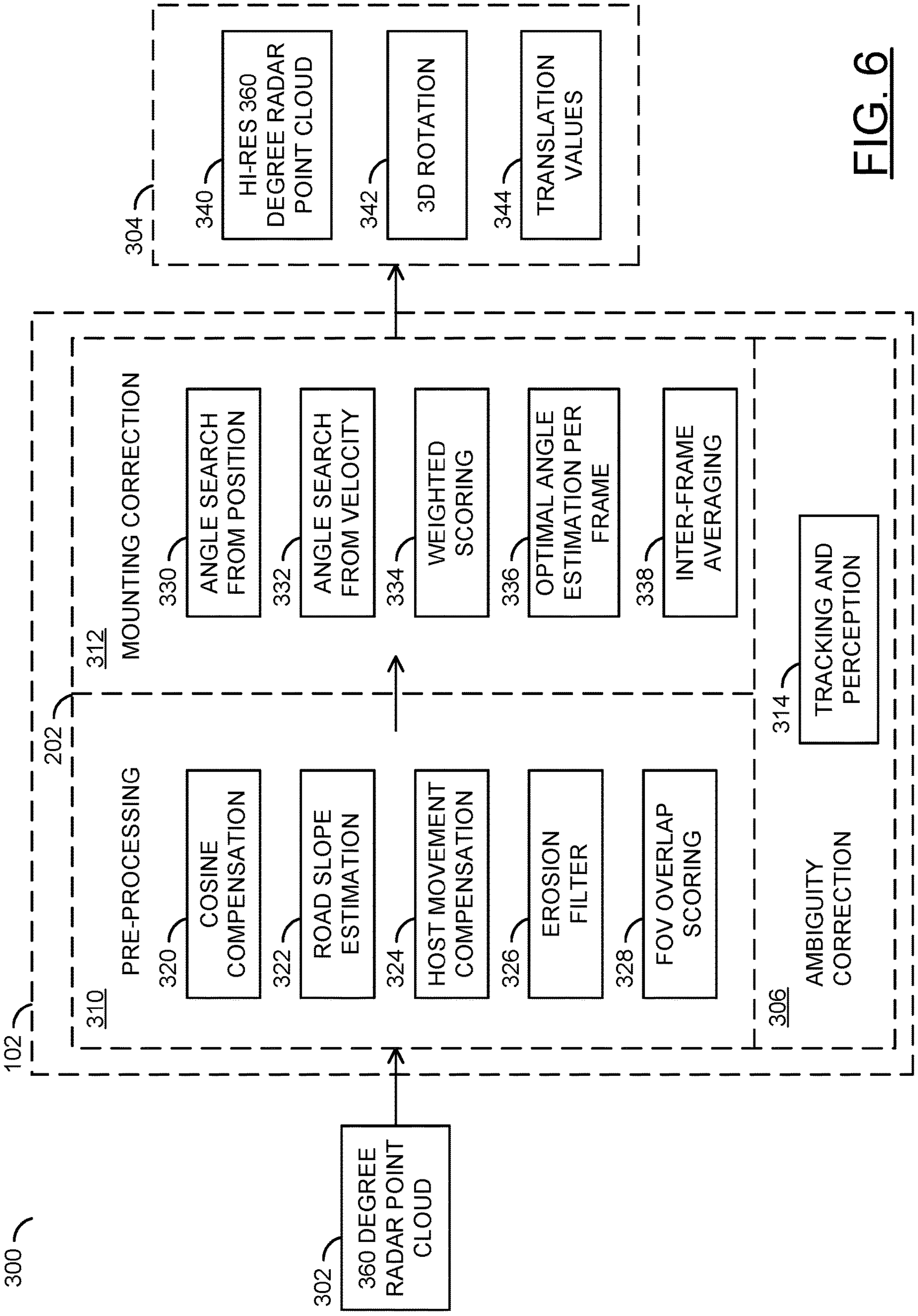
FIG. 6 is a block diagram illustrating pre-processing and mounting correction operations implemented for radar mounting auto-calibration.

Referring to FIG. 6, a block diagram illustrating preprocessing and mounting correction operations implemented for radar mounting auto-calibration is shown. An auto-calibration operation 300 is shown. The auto-calibration operation 300 may comprise the centralized processing device 102, an input 302, and/or an output 304. Generally, the auto-calibration operation 300 may be performed prior to the egospeed estimation. For example, the ensure an accurate basis for determining the egospeed estimation, the auto-calibration operation 300 may be used to calibrate the radar detection devices 110*a*-110*n* (e.g., with auto-calibration, the centralized processing device 102 may generate accurate detections of the static object detections 290*a*-290*z*).

The input 302 may comprise a radar point cloud. The radar point cloud input 302 may comprise the raw radar data captured by the radar detection devices 110*a*-110*n*. In the example shown, the radar point cloud input 302 may comprise a 360° radar point cloud (e.g., captured by the radar frontends 110*a*-110*e* that provide the all-around and/or surround view for the host vehicle 50). In some embodiments, the radar point cloud input 302 may comprise a point cloud of a wide angle field of that may be less than 360° (e.g., a 30° FOV, a 90° FOV, a 180° FOV, a 270° FOV, etc.). The radar point cloud input 302 may be presented to the centralized processing device 102.

The centralized processing device 102 may comprise the egospeed estimation module 202 and/or a block (or circuit) 306. The circuit 306 may implement an ambiguity correction module. The egospeed estimation module 202 may be configured to perform the operations for the auto-calibration. The auto-calibration operation 300 may comprise pre-processing operations 310 and/or mounting correction operations 312. The ambiguity correction module 306 may comprise a block (or circuit) 314. The circuit 314 may implement tracking and/or perception. The tracking and/or perception module 314 may be an application layer configured to handle ambiguity errors. The egospeed estimation module 202 and/or the ambiguity correction module 306 may comprise other modules and/or circuits (not shown). The number, type and/or arrangement of the components and/or modules implemented by the egospeed estimation module 202 may be varied according to the design criteria of a particular implementation.

The pre-processing operations 310 may be configured to format the radar point cloud input 302 for analysis. For example, the pre-processing operations 310 may be configured to clean, transform, reduce, normalize, correct errors and/or encode the raw radar data to ensure the data may be suitable for analysis by the mounting correction operations 312. The pre-processing operations 310 may comprise a block (or circuit) 320, a block (or circuit) 322, a block (or circuit) 324, a block (or circuit) 326, and/or a block (or circuit) 328. The block 320 may implement cosine compensation. The block 322 may implement road slope estimation. The block 324 may implement host movement compensation. The block 326 may implement an erosion filter. The block 328 may implement FOV overlap scoring. Other types of pre-processing may be implemented. The number and/or type of the pre-processing operations 310 may be varied according to the design criteria of a particular implementation.

The cosine compensation module 320 may be configured to measure a radial velocity for the static object detections 290*a*-290*z*. The cosine compensation module 320 may enable recovery of a true speed (e.g., egospeed). The cosine compensation module 320 may be configured to normalize an incidence angle effect. The road slope estimation module 322 may be configured to compensate for any target/object offset created by the physical environment. For example, the road slope estimation module 322 may perform compensation based on a road occupancy and/or road grids. In some embodiments, the road slope estimation module 322 may be configured to divide roads into ramp and non-ramp sections. In some embodiments, the road slope estimation module 322 may perform a fusion of data from the various sensors 160*a*-160*n* (e.g., map data, GPS, inertial sensors, etc.) to provide an accurate road grade map.

The host movement compensation module 324 may be configured to compensate for the movement of the host vehicle 50. The compensation for the movement of the host vehicle 50 may be determined based on a change (e.g., delta) of yaw, pitch and/or roll data over time. For example, one or more of the sensors 160*a*-160*n* may comprise a gyroscope to capture yaw, pitch and/or roll data. The erosion filter 326 may be configured to perform a morphological operation that shrinks the boundaries of an object in an image and/or radar frame. The erosion filter 326 may be configured to convolve the image and/or radar frame with a structuring element, which may determine a size and shape of the erosion. The output of the erosion operation may be a new image and/or radar frame where the pixels in the original image may be eroded (or shrunk). The FOV overlap scoring module 328 may be configured to determine the input for the mounting angle correction. The FOV overlap scoring module 328 may implement a weight-based scraping technique when there are areas in the radar FOV that overlap between multiple of the radar frontends 110*a*-110*n* (e.g., where the radio frequency patterns 62*a*-62*e* overlap each other).

The mounting correction operations 312 may be configured to determine the estimated true angles for each of the radar front-ends 110*a*-110*n*. The mounting correction operations 312 may use the data generated by the pre-processing operations 310 (e.g., based on the radar point cloud input 302) to generate the output 304. The mounting correction operations 312 may comprise a block (or circuit) 330, a block (or circuit) 332, a block (or circuit) 334, a block (or circuit) 336, and/or a block (or circuit) 338. The block 330 may implement an angle search from position module. The block 332 may implement an angle search from velocity module. The block 334 may implement a weighted scoring module. The block 336 may implement an optimal angle estimation per frame module. The block 338 may implement an inter-frame averaging module. The mounting correction operations 312 may comprise additional operations (not shown). The number and/or type of mounting correction operations 312 performed may be varied according to the design criteria of a particular implementation.

The angle search from position module 330 may be configured to implement an iterative histogram bin resolution technique. The iterative histogram bin resolution technique may be based on a position of the 360° (or other wide FOV) centralized radar detection and/or mounting angle input. For example, each of the radar frontends 110*a*-110*n* may be configured to provide data about the current mounting angle of the radar frontends 110*a*-110*n* to the centralized processing device 102 via the data network 52. The angle search from velocity module 332 may be configured to implement an iterative histogram bin resolution technique. The iterative histogram bin resolution technique may be based on a velocity of the 360° (or other wide FOV) centralized radar detection and/or mounting angle input.

The weighted scoring module 334 may be configured to perform a weighted scoring to determine targets and/or objects that may be more suited for mounting correction. The weightings applied for the weighted scoring may be applied based on a location, cluster size, speed and/or the region of interest zone(s). The optimal angle estimate per frame module 336 may be configured to extract a precise mounting angle for the radar frame. The precise mounting angle for the radar frame may be extracted based on data from the angle search from position module 330, the angle search from velocity module 332 and/or the weighted scoring module 334. The precise mounting angle for the radar from the optimal angle estimate per frame module 336 may be the estimated true angle. The inter-frame averaging module 338 may be configured to provide a weighted moving averaging technique across radar frames. The weighted moving averaging techniques may be implemented to smoothen the correction values and/or provide a dynamic correction option.

The tracking and perception module 314 may be configured to determine kinematic trajectories of the static object detections 290*a*-290*z* (e.g., perform tracking). The tracking and perception module 314 may be configured to perform object classification and fusion (e.g., perform perception).

The tracking and perception layer 314 may be configured to implement ambiguity handling for the various characteristics of the estimated true angles at a higher level than the egospeed estimation. In one example, the tracking and perception layer 314 may be an application level process.

The output 304 may be communicated via the signal OUT. In some embodiments, the output 304 may be used internally by the centralized processing circuit 102. In some embodiments, the output 304 may be communicated to other components of the host vehicle 50 via the data network 52. The output 304 may comprise a block (or circuit) 340, a block (or circuit) 342 and/or a block (or circuit) 344. The block 340 may comprise a high resolution radar point cloud (e.g., an accurate point cloud). The block 342 may comprise 3D rotation values. The block 344 may comprise translation values. The output 304 may comprise other data (not shown). The number, type and/or format of the data in the output 304 may be varied according to the design criteria of a particular implementation.

The high resolution radar point cloud 340 may be generated by the centralized processing device 102 in response to the low volume raw radar data generated by the sparse antennas of the radar frontends 110*a*-110*n*. The high resolution radar point cloud 340 may be generated in response to performing the virtual aperture imaging operations. The high resolution radar point cloud 340 may be an output of the centralized processing device 102 and/or may be used internally by the centralized processing device 102. The high resolution radar point cloud 340 may be used to perform egospeed estimation and/or other radar imaging applications.

The 3D rotation values 342 and/or the translation values 344 may comprise the calibration data generated by the auto-calibration operation 300. For example, determining the 3D rotation values 342 and/or the translation values 344 may comprise performing extrinsic calibration. The extrinsic calibration may be implemented to ensure that the radar frontends 110*a*-110*n* of the vehicle 50 accurately perceive the environment 40 to enable critical functionality. The 3D rotation values 342 and/or the translation values 344 may be generated to perform cosine correction.

The 3D rotation values 342 and/or the translation values 344 may be used by the egospeed estimation module 202 to correct the measurements of the static object detections 290*a*-290*z*. Calibrating the measurements of the static object detections 290*a*-290*z* may enable accurate Doppler measurements that may be compensated against the mounting error angles of the radar frontends 110*a*-110*n*. For example, the radar frontends 110*a*-110*n* may be mounted at different locations of the vehicle 50 (e.g., front center, front left, front right, rear right, rear left, etc.). Since the radar frontends 110*a*-110*n* are mounted at different locations, the centralized processing device 102 may be configured to ensure that low-level data generated by each of the radar frontends 110*a*-110*n* may be stitched together accurately using a highly accurate auto calibration technique. The auto calibration technique may be configured to manage the coordinate transformations to provide the output in a vehicle coordinate system (e.g., vehicle coordinates system axes (XV, YV, ZV) may be fixed in a reference frame with respect to the vehicle 50 with an origin at the vehicle sprung mass). Ensuring that the low-level data of the radar frontends 110*a*-110*n* may be transformed into the centralized vehicle coordinate system may enable accurate egospeed measurements.

The 3D rotation values 342 may be a 3D rotation matrix. The 3D rotation may be a spatial transformation that affects the position and/or orientation of objects. The 3D rotation values 342 may provide data that may be used to turn an object around an axis. The 3D rotation values 342 may perform the spatial transformation that maintains the relative distances between points. Generally, the rotation transformation may have a fixed axis.

The translation values 344 may be a translation matrix. The translation may be a spatial transformation that affects the position and/or orientation of objects. The translation values 344 may provide data that may be used to move an object from one point to another without altering an orientation of the object. The translation values 344 may perform the spatial transformation that may shift an object along a straight path in space.

Figure 7:
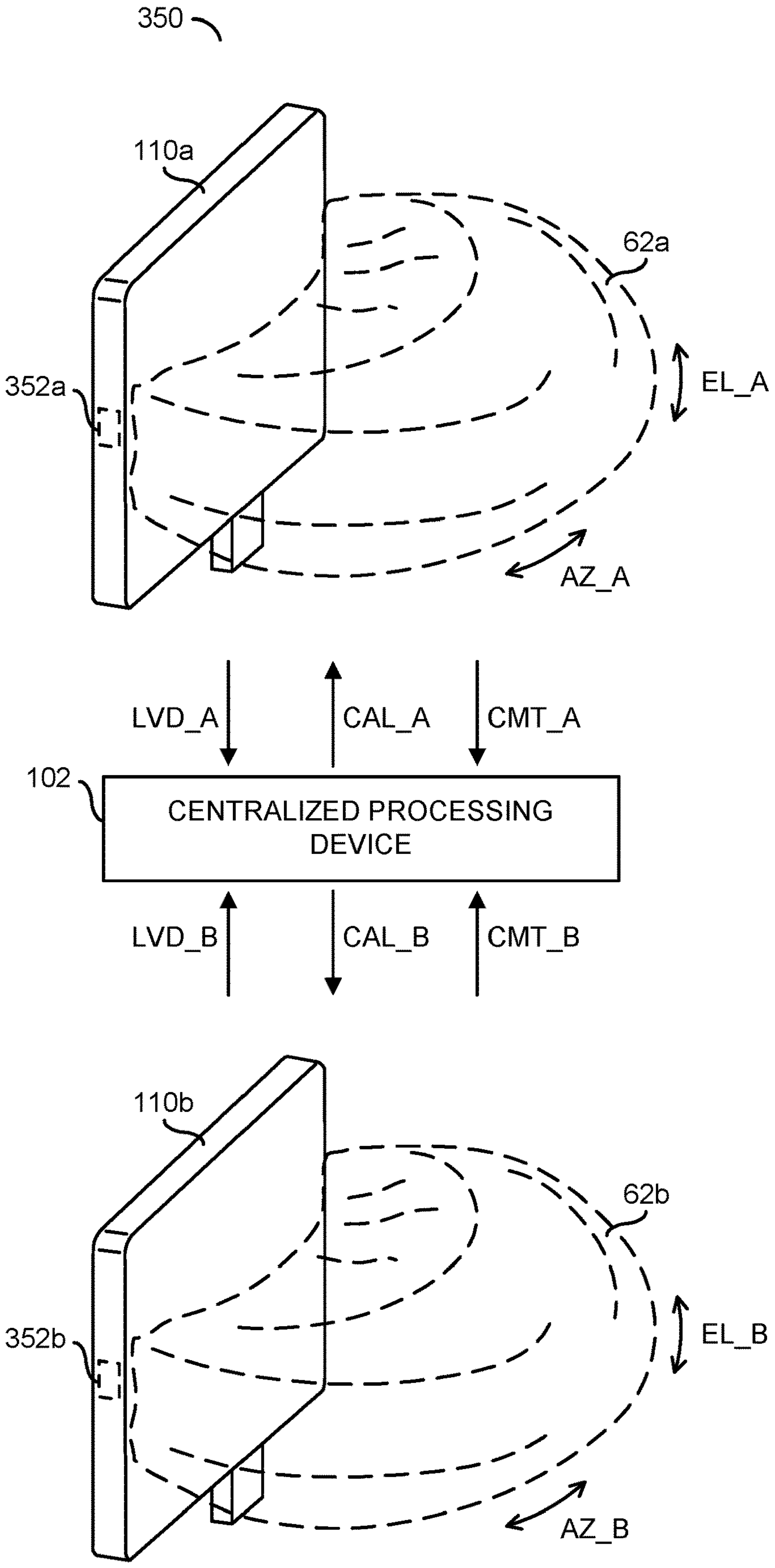
FIG. 7 is a diagram illustrating auto-calibration of multiple radar devices.

Referring to FIG. 7, a diagram illustrating auto-calibration of multiple radar devices is shown. Radar device mountings 350 are shown. The radar device mountings 350 may comprise the centralized processing device 102 and the radar frontends 110*a*-110*b*. Two of the radar frontends 110*a*-110*b* may be provided in the example shown as an illustrative example. However, the radar devices mountings 350 may similarly be applicable to each of the radar frontends 110*a*-110*n* implemented by the host vehicle 50.

The radar frontends 110*a*-110*b* are each shown presenting the respective radio frequency patterns 62*a*-62*b*. The radio frequency patterns 62*a*-62*b* may each comprise corresponding elevation angles EL_A-EL_B and azimuth angles AZ_A-AZ_B. The radio frequency patterns 62*a*-62*b* are shown as partial lobes of the probe signals TX_A-TX_B. The radar frontends 110*a*-110*b* may be configured to generate the low volume raw radar data LVD_A-LVD_B in response to receiving the reflected signals RX_A-RX_B in response to the probe signals TX_A-TX_B reflecting off the static objects in the environment 40. The raw radar data LVD_A-LVD_B may be presented to the centralized processing device 102 to enable the auto-calibration and/or the egospeed estimation.

The radar frontends 110*a*-110*b* are shown comprising respective blocks (or circuits) 352*a*-352*b*. The circuits 352*a*-352*b* may be a mounting angle driver. The mounting angle drivers 352*a*-352*b* may be configured to determine a current mounting angle of the respective radar frontends 110*a*-110*b*. The mounting angle drivers 352*a*-352*b* may be configured to generate signals (e.g., CMT_A-CMT_B). The signals CMT_A-CMT_B may comprise current mounting angle data. The current mounting angle data may be used by the angle search from position module 330 and/or the angle search from velocity module 332. The current mounting angle data may be used for performing the auto-calibration to determine the estimated true mounting angles.

In some embodiments, the mounting angle drivers 352*a*-352*b* may be configured to adjust and/or rotate the radar frontends 110*a*-110*b*. For example, the mounting angle drivers 352*a*-352*b* may be configured to physically adjust the mounting angle of the radar frontends 110*a*-110*b* to change the elevation angles EL_A-EL_B and/or the azimuth angles AZ_A-AZ_B of the radio frequency patterns 62*a*-62*b*. For example, the centralized processing device 102 may be configured to determine corrections to the mounting angles of the radar frontends 110*a*-110*b* based on the current mounting angles of the radar frontends 110*a*-110*b* and the estimated true angles determined in response to the auto-calibration operations. In an example, the centralized processing device 102 may be configured to generate signals (e.g., CAL_A-CAL_B). The signals CAL_A-CAL_B may comprise the correction data. The mounting angle drivers 352*a*-352*b* may be configured to adjust the radar frontends

110*a*-110*b* from the current mounting angles (e.g., with mounting errors) to the estimated true mounting angle in response to the signals CAL_A-CAL_B.

To perform the egospeed estimation, precise knowledge of the mounting angles of the radar frontends 110*a*-110*n* may be a prerequisite. The auto-calibration may be implemented to avoid tedious manual work of calibrating the sensor mounting angles. Generally, the auto-calibration may be performed without physically moving the radar frontends 110*a*-110*n*. The auto-calibration may be configured to estimate the mounting angles and/or calibrate the captured data based on the estimated true angles. Generally, the initial mounting angles of the radar frontends 110*a*-100*n* may be provided by an operator, designer, engineer and/or technician. The true mounting angles may be estimated by the centralized processing device 102 in response to an analysis of the radar data.

Figure 8:
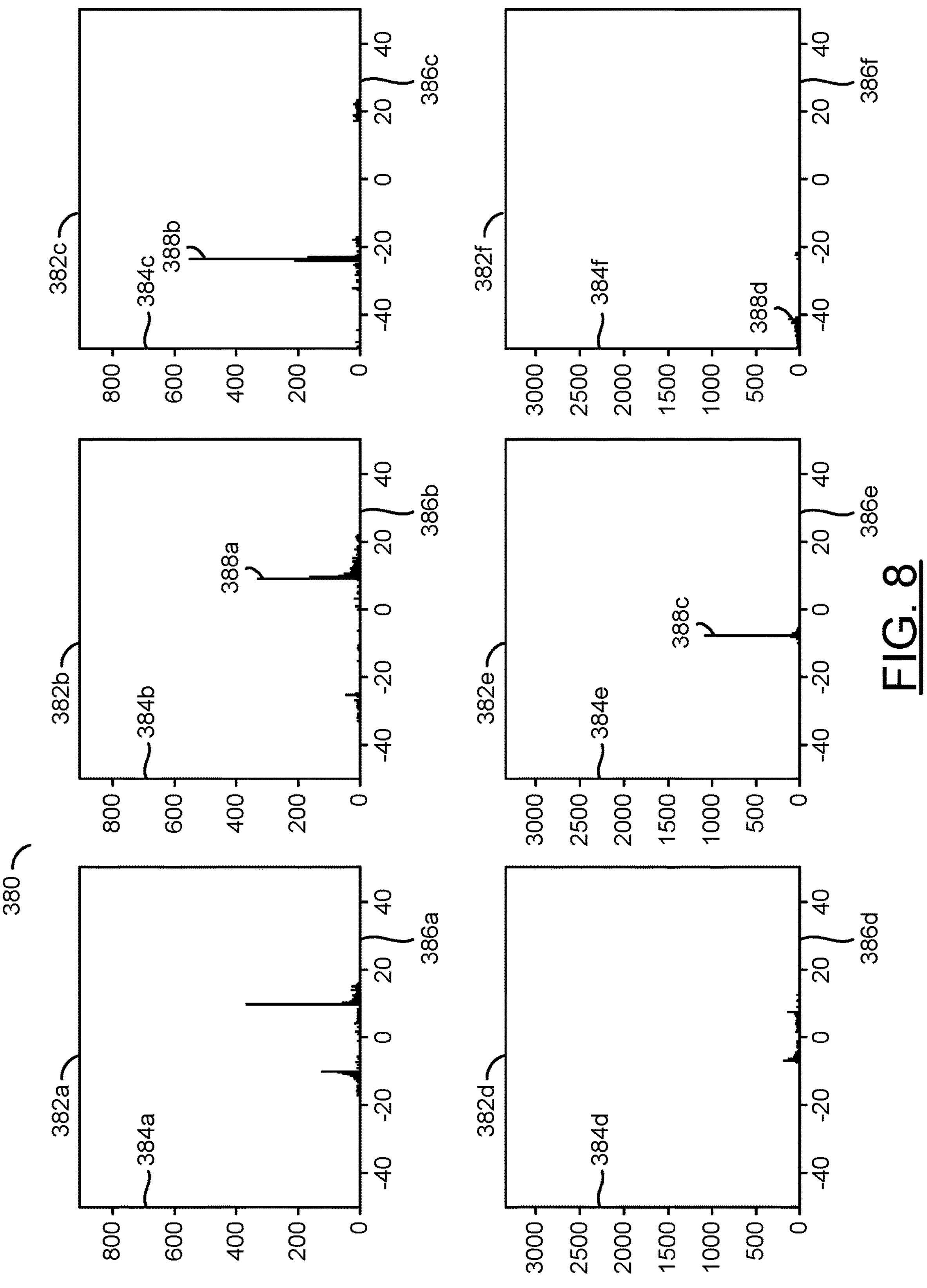
FIG. 8 is a diagram illustrating Doppler measurement histograms.

Referring to FIG. 8, a diagram illustrating Doppler measurement histograms is shown. Doppler measurement histograms 380 for egospeed estimation are shown. The Doppler measurement histograms 380 may comprise a number of graphs 382*a*-382*f*. Each of the graphs 382*a*-382*f* may provide an example of a Doppler measurement histogram.

Each of the Doppler measurement histograms 382*a*-382*f* may comprise respective axes 384*a*-384*f* and respective axes 386*a*-386*f*. The axes 384*a*-384*f* may each be a Y-axis. The axes 386*a*-386*f* may each be an X-axis. The Y-axes 384*a*-384*f* provide Doppler detections. For example, the Doppler detections may represent a density of detections of the static object detections 290*a*-290*z*. For the Y-axes 384*a*-384*c* the detection density may range from 0-800 and for the Y-axes 384*d*-384*f*, the detection density may range from 0-3000. The X-axes 386*a*-386*f* may provide Doppler speed. For example, the Doppler speed may be measured in m/s with positive values indicating static object detections 290*a*-290*z* that the host vehicle 50 may be approaching and negative values that the static object detections 290*a*-290*z* may be moving away from. In the example shown, the X-axes 386*a*-386*f* may range from −50 m/s to +50 m/s. The Doppler measurement histograms 382*a*-382*f* may illustrate a distribution of speeds measured using the Doppler method for different targets (e.g., the static object detections 290*a*-290*z*). The detection and/or measurement of the velocity of the objects may be determined by analyzing the frequency shift.

The egospeed estimation module 202 may be configured to perform Doppler histogram peak searching to determine the egospeed estimation. The auto-calibration of the mounting angles may be used to perform cosine angle correction. Using the cosine-corrected angle compensation, the egospeed estimation module 202 may be configured to determine the cosine corrected Doppler measurements. For example, the cosine-angle correction may compensate for the impacts of the detection angle errors so that the egospeed may be retrieved from the Doppler measurements of the static object detections 290*a*-290*z*.

The Doppler measurement histograms 382*a*-382*f* may be projected into Doppler bins based on a selected bin resolution. The histogram bin resolution may determine the egospeed estimation accuracy. In one example, the Doppler speed histogram bin resolution may be 0.1 m/s. The bin size selected may be dependent on a trade-off between accuracy and/or computational resources. For example, a smaller bin size may provide higher accuracy at the cost of more computational resources. Doppler histogram peaks 388*a*-388*d* are shown. The Doppler histogram peaks 388*a*-388*d* may correspond to one of the Doppler speed histogram bins. The Doppler histogram peaks 388*a*-388*d* may be determined based on searching the Doppler bins for a peak value. For example, the egospeed estimation module 202 may select the Doppler speed measurement as the Doppler bin that corresponds to the highest number of the static object detections 290*a*-290*z*. The particular bin size for the histogram bin resolution may be varied according to the design criteria of a particular implementation.

The Doppler histogram peaks 388*a*-388*d* may be determined based on the static object detections 290*a*-290*z*. In some scenarios, there may be a maximum value limitation on the Doppler measurements. In response to a maximum value limitation, one or multiple Doppler bands may be determined by flipping the Doppler histogram peak bin upon detecting a maximum Doppler value. The egospeed estimation module 202 may be configured to perform static object and moving object separation. For example, screening may be performed on the 360° FOV detections to filter the static object detections 290*a*-290*z* from the moving object detections (or noise) 292*a*-292*m*.

The egospeed estimation module 202 may be configured to estimate the egospeed in response to the Doppler measurements. For example, the egospeed may be determined based on a conversion from the Doppler speed measurements selected as the Doppler histogram peak. An equation (EQ1) may be used to determine the egospeed from the Doppler speed measurements when no maximum value limitation is detected:

$$\text{Doppler} = egoSpeed * \cos(\text{azimuth}) * \cos(\text{elevation}) \qquad \text{EQ1}$$

where the Doppler speed may be determined from static object detections 290*a*-290*z* without a flip. The Doppler value may be the Doppler speed measurements. The azimuth value may be the azimuth angle. The elevation value may be the elevation angle.

An equation (EQ2) may be used to determine the egospeed from the Doppler speed measurements when a maximum value limitation is detected:

$$\text{Doppler} = egoSpeed * \cos(\text{azimuth}) * \cos(\text{elevation}) + N * \max D \qquad \text{EQ2}$$

where the Doppler speed may be determined from the static object detections 290*a*-290*z* with a flip. The value N may be the number of Doppler flips of each radar detection. The value maxD may be the radar maximum Doppler speed.

In an example, if the Doppler speed measurements do not have a maximum limitation, the relationship between Doppler speed and the egospeed may be defined by the equation EQ1. In another example, the Doppler speed measurements may be flipped upon a maximum value. The maximum value may be caused by a waveform design and/or cost considerations. When a maximum value is detected, then the relationship between the Doppler speed and the egospeed may be defined by the equation EQ2. The egospeed estimation module 202 may be configured to attempt different numbers of Doppler flips for the highest Doppler histogram peak. Attempting the different Doppler flips may enable correctly estimating the egospeed in the case of Doppler ambiguity.

The egospeed estimation module 202 may be configured to generate the Doppler histograms 382*a*-382*f*. The Doppler histograms 382*a*-382*f* may be calculated by counting Doppler values of radar detections (e.g., the static object detections 290*a*-290*z*) at each Doppler bin. In one example, if the Doppler speeds have a range between −100 m/s and 100 m/s and the Doppler bins have a 0.1 m/s measurement resolution, then there may be 2000 Doppler bins. For example, the X-axes 386*a*-386*f* may be divided into a number of bins (e.g., consecutive, non-overlapping intervals).

As described in the equation EQ1 and/or the equation EQ2, raw Doppler speed measurements of the static object detections 290*a*-290*z* may be determined based on egospeed and azimuth angle. To remove an impact of the azimuth angle, the raw Doppler speeds may be divided by a cosine of the azimuth angle before histogram counting. In order to account for Doppler flips upon the maximum Doppler value, the Doppler flip corrections may also be performed before histogram counting. The histogram counting may be the height of each bar/value in the histogram within a corresponding bin (e.g., representing a frequency or count of data points that fall within the corresponding bin). Assuming that the Doppler speed from the static object detections 290*a*-290*z* are the most frequent, the highest Doppler peak after cosine angle correction (and flip correction) may be selected by the egospeed estimation module 202 for the egospeed estimation. The egospeed estimation module 202 may attempt different numbers of Doppler flips in order to determine the highest Doppler histogram peak to enable the egospeed to be accurately estimated in scenarios with Doppler ambiguity.

In the example shown, the histogram 382*a* may be a raw Doppler histogram (e.g., before auto-calibration) of a scenario where the egospeed may be 23.4 m/s and the maximum Doppler value may be 16.9 m/s. The Doppler flips may occur for static objects in the scenario of the histogram 382*a* because the egospeed may be larger than the maximum Doppler value. In the example shown, the histogram 382*b* may be the Doppler histogram after cosine angle correction, but without any Doppler flip correction. The Doppler peak value 388*a* may be at 380 at approximately 6.5 m/s. In the example shown, the histogram 382*c* may be the Doppler histogram after cosine angle correction but with one Doppler flip correction. The Doppler peak value 388*b* may be approximately 560 at −23.4 m/s. Since the highest Doppler peak occurs at −23.4 m/s (e.g., a negative value at a Doppler peak value of 560) after a single Doppler flip correction, the egospeed may be estimated as 23.4 m/s.

In the example shown, the histogram 382*d* may be a raw Doppler histogram of a scenario where the egospeed may be 7.5 m/s and the maximum Doppler value may be 16.9 m/s. The Doppler flips may not occur for static objects in the scenario of the histogram 382*d* because the egospeed may be less than the maximum Doppler value. In the example shown, the histogram 382*e* may be the Doppler histogram after cosine angle correction, but without any Doppler flip correction. The Doppler peak value 388*c* may be approximately 1120 at −7.5 m/s. In the example shown, the histogram 382*f* may be the Doppler histogram after cosine angle correction but with one Doppler flip correction. The Doppler peak value 388*d* may be approximately 70 at −41 m/s. Since the highest Doppler peak is present at −7.5 m/s (e.g., with a Doppler peak value of 1120) without any Doppler flip correction, the egospeed may be estimated as 7.5 m/s.

Figure 9:
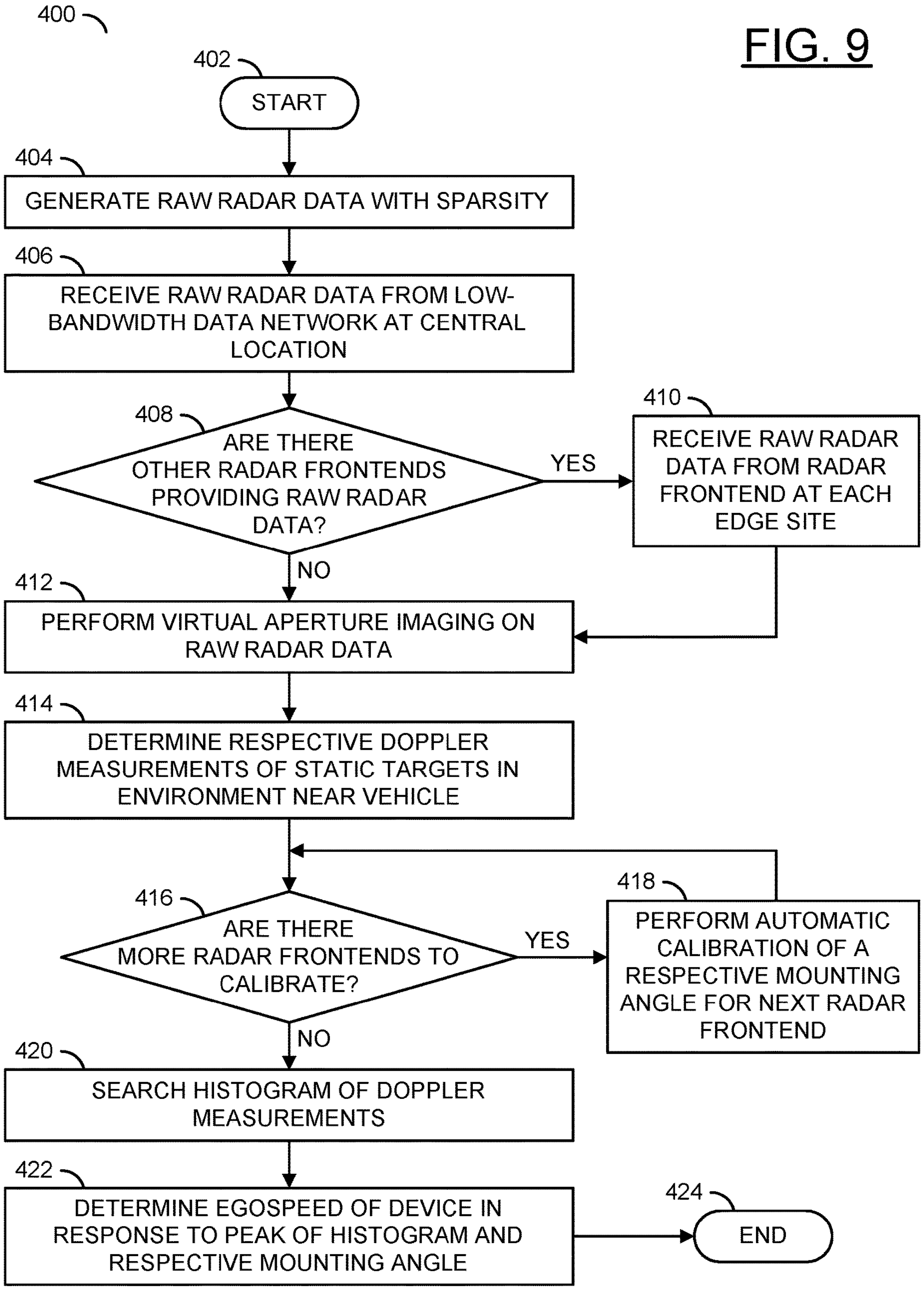
FIG. 9 is a flow diagram illustrating a method for estimating egospeed for centralized radar systems.

Referring to FIG. 9, a method (or process) 400 is shown. The method 400 may estimate egospeed for centralized radar systems. The method 400 generally comprises a step (or state) 402, a step (or state) 404, a step (or state) 406, a decision step (or state) 408, a step (or state) 410, a step (or state) 412, a step (or state) 414, a decision step (or state) 416, a step (or state) 418, a step (or state) 420, a step (or state) 422, and a step (or state) 424.

The step 402 may start the method 400. In the step 404, one or more of the radar frontends 110*a*-110*n* may each generate the raw radar data LVD_A-LVD_N with sparsity. In an example, the radar frontends 110*a*-110*n* may each implement the sparse antenna array at various edge sites of the vehicle 50. Next, in the step 406, the radar data interface 104 may receive the raw radar data LVD_A-LVD_N from the low-bandwidth data network 52 at a centralized location. In an example, the centralized processing device 102 may be implemented at a generally central location of the vehicle 50. In another example, the centralized processing device 102 may be implemented in a particular zone of the vehicle 50 that may be generally central to a subset of sensors and/or a subset of the radar frontends 110*a*-110*n* of the vehicle 50. Next, the method 400 may move to the decision step 408.

In the decision step 408, the centralized processing device 102 may determine whether there are other of the radar frontends 110*a*-110*n* that may provide the raw radar data. Generally, each of the radar frontends 110*a*-110*n* may continually stream the raw radar data to the centralized processing device 102. In some embodiments, the dynamic scheduling module 200 may select a particular group and/or subset of the radar frontends 110*a*-110*n* to generate the sparse raw radar data. If there are other of the radar frontends 110*a*-110*n* that may still provide the raw radar data LVD_A-LVD_N, then the method 400 may move to the step 410. In the step 410, the radar data interface 104 may receive the raw radar data LVD_A-LVD_N from the radar frontends 110*a*-110*n* at each edge site of the vehicle 50. Next, the method 400 may move to the step 412. In the decision step 408, if there are no other radar frontends 110*a*-110*n* that may provide the raw radar data LVD_A-LVD_N, then the method 400 may move to the step 412. In the example shown, the steps 408-412 may be shown as sequential steps. However, the steps 408-412 may be performed in parallel and/or substantially in parallel.

In the step 412, the centralized processing device 102 may perform the virtual aperture imaging on the raw radar data LVD_A-LVD_N. In an example, the centralized processing device 102 may use the sparse raw radar data LVD_A-LVD_N as input for the virtual aperture imaging performed by the CVAI 130. Next, in the step 414, the centralized processing device 102 may determine respective Doppler measurements of the static object detections 290*a*-290*z* in the environment 40 near the vehicle 50. In an example, the Doppler measurements may comprise Doppler speeds. Next, the method 400 may move to the decision step 416.

In the decision step 416, the centralized processing device 102 may determine whether there are more of the radar frontends 110*a*-110*n* to calibrate. For example, the estimated true angle for each of the radar frontends 110*a*-110*n* may be determined. In the decision step 416, if there are more of the radar frontends 110*a*-110*n* to calibrate, then the method 400 may move to the step 418. In the step 418, the centralized processing device 102 may perform the automatic calibration of the respective mounting angle (e.g., determine the estimated true angle) for the next one of the radar frontends 110*a*-110*n*. Next, the method 400 may return to the decision step 416. In the example shown, the steps 416-418 may be sequential for illustrative purposes. However, the steps 416-418 may be performed in parallel and/or substantially in parallel. In the decision step 416, if all of the radar frontends 110*a*-110*n* have been calibrated, then the method 400 may move to the step 420.

In the step 420, the centralized processing device 102 may search the histogram (e.g., the histograms 382*a*-382*f* shown in association with FIG. 8) of Doppler speed measurements. For example, a peak Doppler speed may be determined having the highest density of detections of the static object detections 290*a*-290*z*. Next, in the step 422, the centralized processing device 102 may determine the egospeed of the apparatus 100 in response to the peak of the histogram and the respective mounting angles. For example, the egospeed may be determined according to the equations EQ1 or EQ2. Next, the method 400 may move to the step 424. The step 424 may end the method 400.

Figure 10:
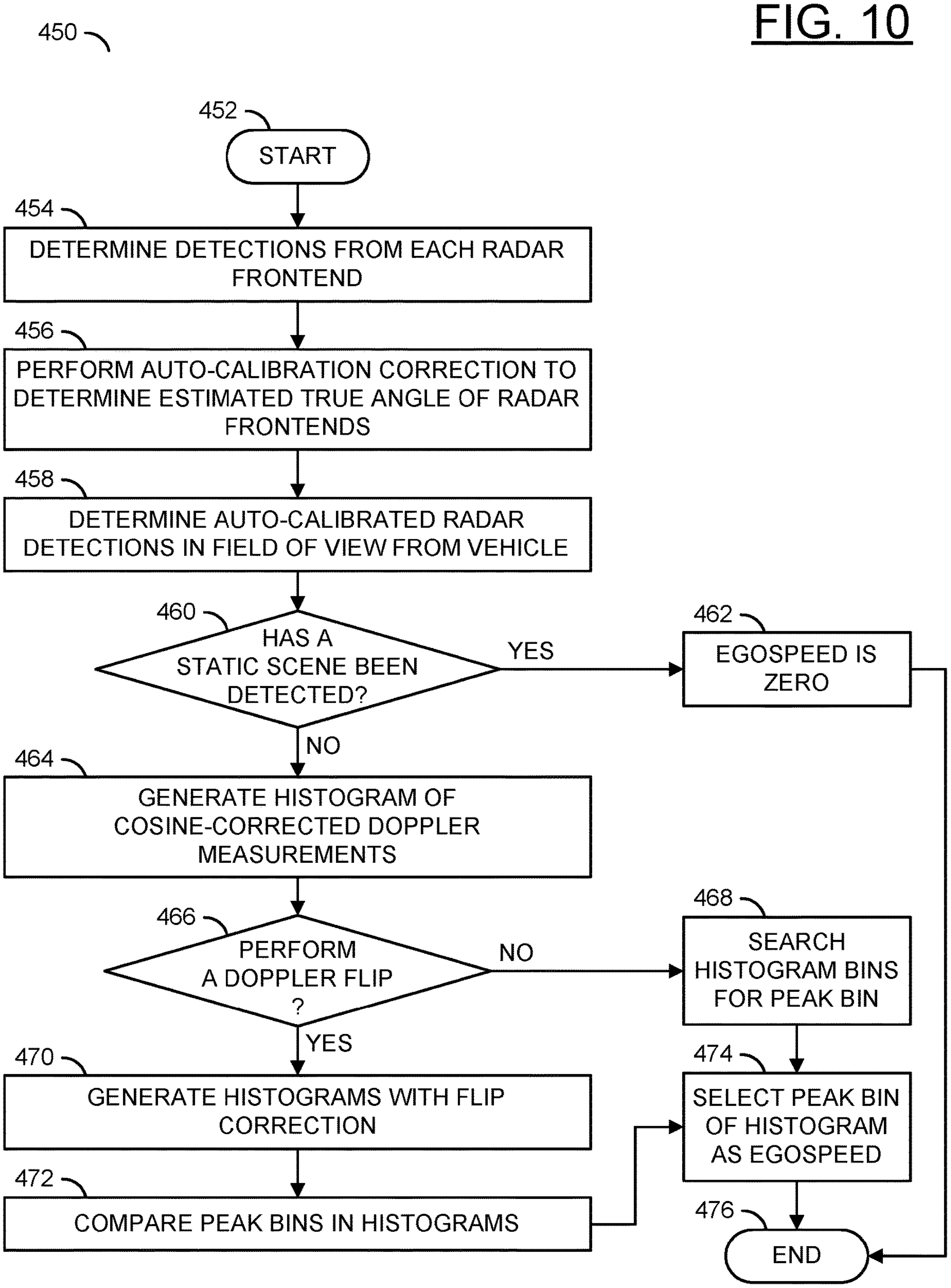
FIG. 10 is a flow diagram illustrating a method for performing a Doppler flip correction.

Referring to FIG. 10, a method (or process) 450 is shown. The method 450 may perform a Doppler flip correction. The method 450 generally comprises a step (or state) 452, a step (or state) 454, a step (or state) 456, a step (or state) 458, a decision step (or state) 460, a step (or state) 462, a step (or state) 464, a decision step (or state) 466, a step (or state) 468, a step (or state) 470, a step (or state) 472, a step (or state) 474, and a step (or state) 476.

The step 452 may start the method 450. In the step 454, the centralized processing device 102 may determine the static object detections 290*a*-290*z* from each of the radar frontends 110*a*-110*n*. Next, in the step 456, the egospeed estimation module 202 may perform the auto-calibration correction to determine the estimated true angle of the radar frontends 110*a*-110*n*. In the step 458, the egospeed estimation module 202 may determine the auto-calibrated radar detections in the field of view from the vehicle 50. Next, the method 450 may move to the decision step 460.

In the decision step 460, the egospeed estimation module 202 may determine whether a static scene has been detected. A static scene may be detected if there is no movement with respect to the apparatus 100 (e.g., the Doppler measurements from the static object detections 290*a*-290*z* are all equal to zero). If the static scene has been detected, the method 450 may move to the step 462. In the step 462, the egospeed estimation module 202 may determine that the egospeed is zero. Next, the method 450 may move to the step 476. In the decision step 460, if a static scene has not been detected, then the method 450 may move to the step 464. In the step 464, the egospeed estimation module 202 may generate the histogram of cosine corrected Doppler measurements (e.g., one or more of the histograms 382*a*-382*n*). For example, the first histogram generated may be generated without the Doppler flip. Next, the method 450 may move to the decision step 466.

In the decision step 466, the egospeed estimation module 202 may determine whether to perform a Doppler flip operation. For example, the Doppler flip operation may be performed according to the equation EQ2. In one example, the Doppler flip operation may be performed to circumvent a maximum value limitation of the Doppler measurements (e.g., due to waveform design and/or cost considerations). If no Doppler flip is performed, then the method 450 may move to the step 468. In the step 468, the egospeed estimation module 202 may search the histogram bins for a peak bin. Next, the method 450 may move to the step 474. For example, the egospeed may be determined without a flip according to the equation EQ1. In the decision step 466, if a Doppler flip is performed, then the method 450 may move to the step 470.

In the step 470, the egospeed estimation module 202 may generate one or more histograms with a flip correction. Next, in the step 472, the egospeed estimation module 202 may compare peak bins in the histogram (e.g., compare the histogram without a flip to the histogram with a flip). In some embodiments, additional histograms may be generated with more than one flip. For example, the egospeed may be determined according to the equation EQ2. Next, the method 450 may move to the step 474. In the step 474, the egospeed estimation module 202 may select the peak bin of the histogram for the egospeed. Next, the method 450 may move to the step 476. The step 476 may end the method 450.

Figure 11:
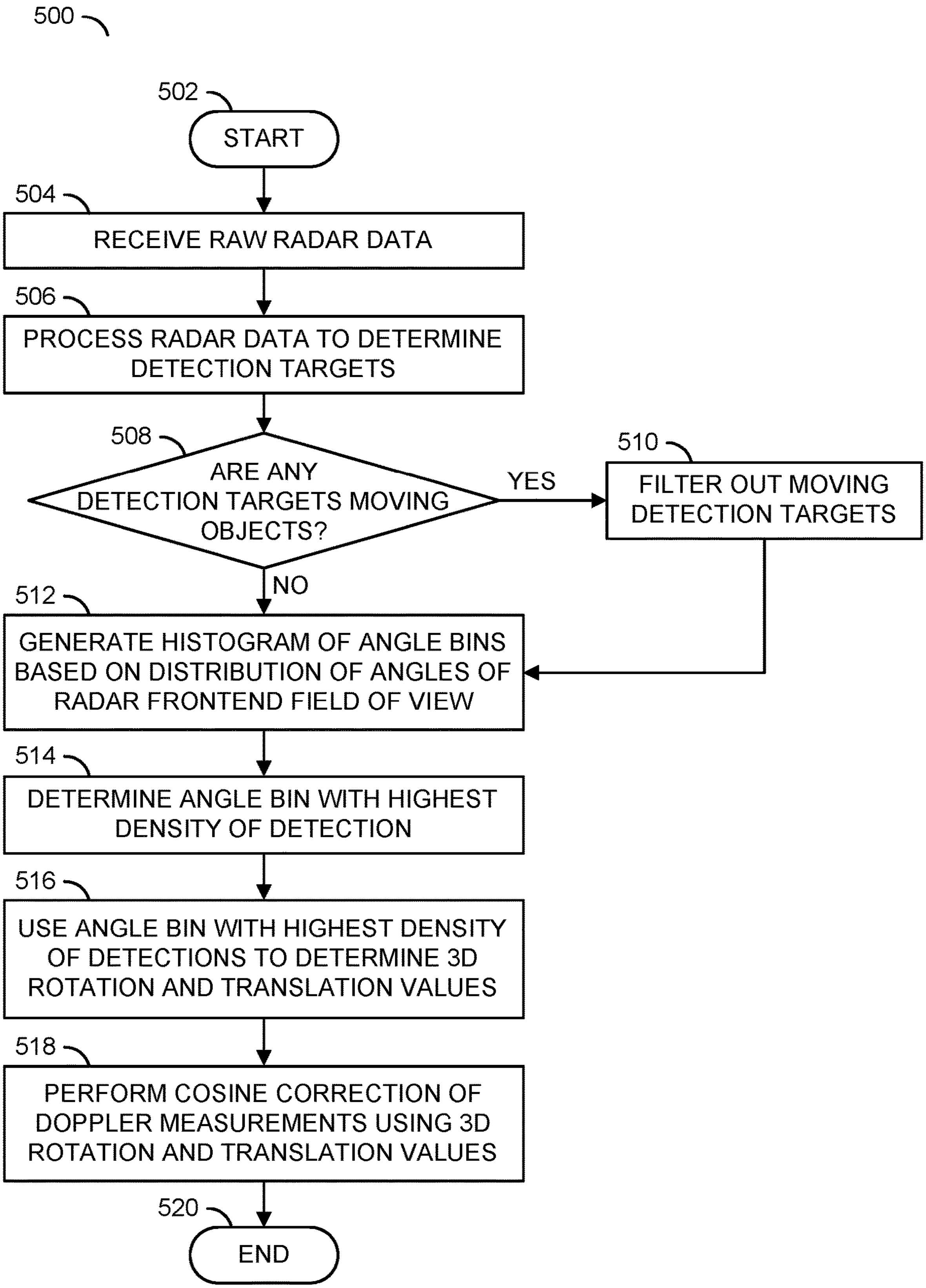
FIG. 11 is a flow diagram illustrating a method for auto-calibration of radar devices.

Referring to FIG. 11, a method (or process) 500 is shown. The method 500 may perform auto-calibration of radar devices. The method 500 generally comprises a step (or state) 502, a step (or state) 504, a step (or state) 506, a decision step (or state) 508, a step (or state) 510, a step (or state) 512, a step (or state) 514, a step (or state) 516, a step (or state) 518, and a step (or state) 520.

The step 502 may start the method 500. In the step 504, the centralized processing device 102 may receive the raw radar data. Next, in the step 506, the centralized processing device 102 may process the radar data to determine detection targets in the environment 40. Next, the method 500 may move to the decision step 508.

In the decision step 508, the centralized processing device 102 may determine whether any of the targets detected are the moving object detections 292*a*-292*m*. If there are the moving object detections 292*a*-292*m*, then the method 500 may move to the step 510. In the step 510, the centralized processing device 102 may filter out the moving object detections 292*a*-292*m* (e.g., so that the static object detections 290*a*-290*z* remain). For example, static band localization may be implemented to enable screening of static/moving objects to separate the static object detections 290*a*-290*z* and the moving object detections 292*a*-292*m*. Next, the method 500 may move to the step 512. In the decision step 508, if there are no moving objects, then the method 500 may move to the step 512.

In the step 512, the egospeed estimation module 202 may generate a histogram of angle bins based on a distribution of angles of the field of view of one of the radar frontends 110*a*-110*n*. Next, in the step 514, the egospeed estimation module 202 may determine the angle bin with the highest density of detections of the static object detections 290*a*-290*z*. In the step 516, the egospeed estimation module 202 may use the angle bin with the highest density of detections to determine the 3D rotation values 342 and/or the translation values 344. Next, in the step 518, the egospeed estimation module 202 may perform cosine correction of the Doppler measurements using the 3D rotation values 342 and/or the translation values 344. Generally, the angle bin with the highest density of detections may be determined for each of the radar frontends 110*a*-110*n* to determine the estimated true angle for calibration to cosine correct the Doppler measurements. Next, the method 500 may move to the step 520. The step 520 may end the method 500.

Figure 12:
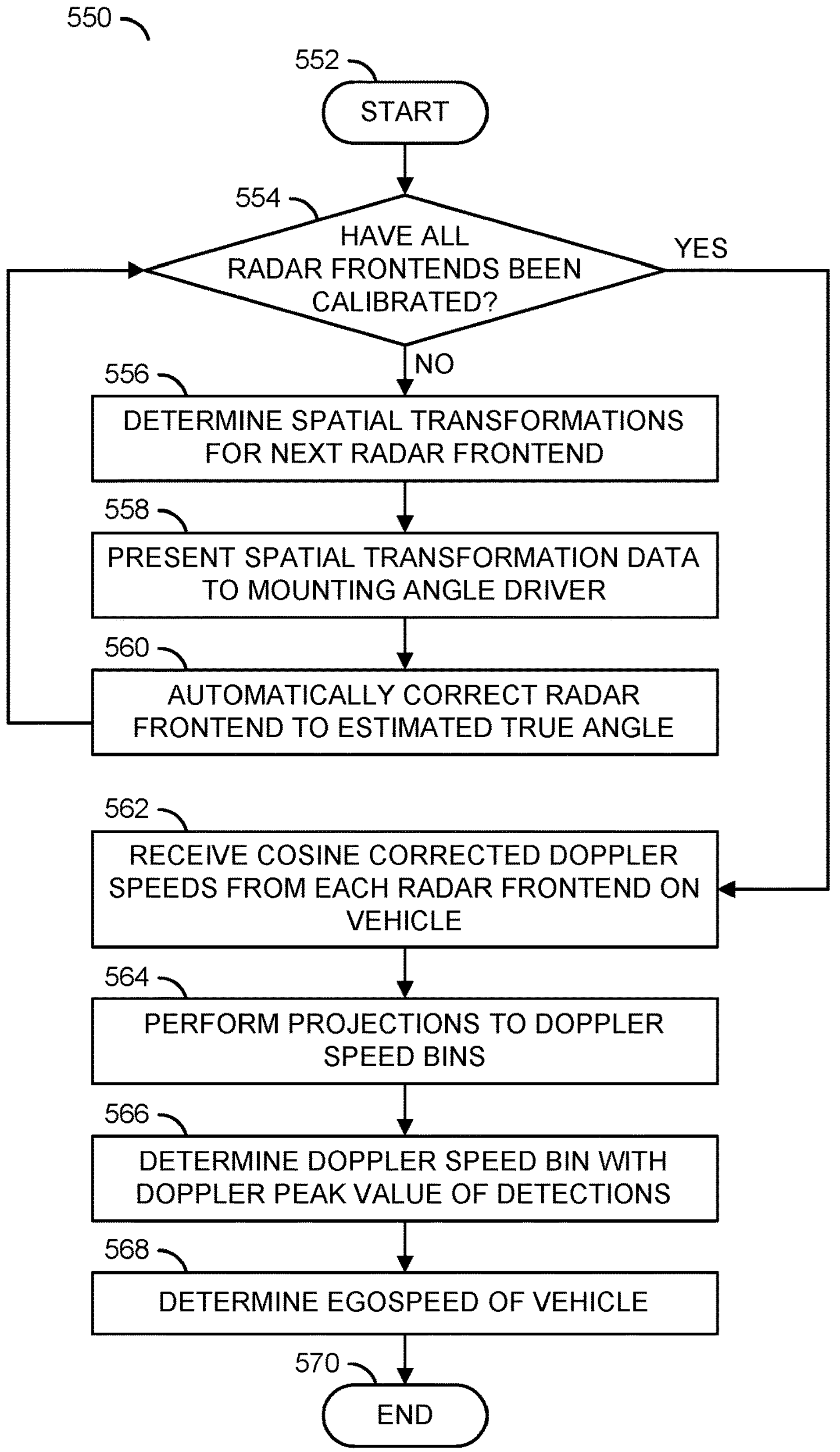
FIG. 12 is a flow diagram illustrating a method for using Doppler speed bins to determine a histogram peak.

Referring to FIG. 12, a method (or process) 550 is shown. The method 550 may use Doppler speed bins to determine a histogram peak. The method 550 generally comprises a step (or state) 552, a decision step (or state) 554, a step (or state) 556, a step (or state) 558, a step (or state) 560, a step (or state) 562, a step (or state) 564, a step (or state) 566, a step (or state) 568, and a step (or state) 570.

The step 552 may start the method 550. Next, in the decision step 554, the egospeed estimation module 202 may determine whether all of the radar frontends 110*a*-110*n* have been calibrated. If not, the method 550 may move to the step 556. In the step 556, the egospeed estimation module may determine the spatial transformations for the next one of the radar frontends 110*a*-110*n* (e.g., the 3D rotation values 342 and/or the translation values 344). Next, in the step 558, the centralized processing device 102 may present the spatial transformation data (e.g., one of the signals CAL_A-CAL_N) to the respective mounting angle driver 352*a*-352*n*. In the step 560, the mounting angle driver may automatically correct the respective radar frontend 110*a*-110*n* to the estimated true angle (e.g., automatically move/aim the radar device). Next, the method 550 may return to the step 554.

In the decision step 554, if all of the radar frontends 110*a*-110*n* have been calibrated, then the method 550 may move to the step 562. In the step 562, the egospeed estimation module 202 may receive the cosine corrected Doppler speed measurements from each of the radar frontends 110*a*-110*n* on the vehicle 50. Next, in the step 564, the egospeed estimation module 202 may perform projections of the Doppler measurements to the Doppler speed bins. For example, the egospeed estimation module 202 may select a size of each of the Doppler speed bins (e.g., 0.01 m/s, 0.1 m/s, 0.2 m/s, etc.). In the step 566, the egospeed estimation module 202 may determine the Doppler speed bin with the Doppler peak value of detections. Next, in the step 568, the egospeed estimation module may use the Doppler speed value that corresponds to the peak Doppler speed bin in the equation EQ1 or the equation EQ2 to calculate the egospeed of the vehicle 50. Next, the method 550 may move to the step 570. The step 570 may end the method 550.

The functions performed by the diagrams of FIGS. 1-12 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. Execution of instructions contained in the computer product by the machine, may be executed on data stored on a storage medium and/or user input and/or in combination with a value generated using a random number generator implemented by the computer product. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:

an interface configured to receive raw radar data from a plurality of radar devices, wherein (i) said plurality of radar devices are each implemented at a respective edge site; and a processor configured to (i) receive said raw radar data corresponding to each of said radar devices from said interface, (*ii*) perform virtual aperture imaging in response said raw radar data, (iii) perform an automatic calibration of a respective mounting angle for each of said radar devices, (iv) determine respective Doppler measurements of a plurality of targets in an environment, (iv) search a histogram of said Doppler measurements, (v) determine an ego speed of said apparatus in response to (a) a peak of said histogram of said Doppler measurements and (b) said respective mounting angles of said plurality of radar devices, and (*vi*) generate an output signal comprising said ego speed of said apparatus, wherein said plurality of radar devices provide a field of view of said environment.

2. The apparatus according to claim 1, wherein said field of view of said environment provided by said plurality of radar devices comprises a 360 degree field of view.

3. The apparatus according to claim 2, wherein said 360 degree field of view is generated by five of said plurality of radar devices.

4. The apparatus according to claim 1, wherein said edge sites for said plurality of radar devices correspond to locations on a vehicle.

5. The apparatus according to claim 1, wherein (i) said plurality of targets are static objects and (ii) each of said plurality of radar devices are configured to generate said raw radar data from different angles for each of said plurality of targets.

6. The apparatus according to claim 1, wherein (i) said Doppler measurements comprise a cosine-corrected Doppler speed and (ii) said cosine-corrected Doppler speed is determined in response to said automatic calibration of said respective mounting angles of each of said plurality of radar devices.

7. The apparatus according to claim 1, wherein said automatic calibration is configured to correct said respective mounting angles from errors caused by (i) an improper mounting angle at installation and (ii) mounting angle drift.

8. The apparatus according to claim 1, wherein said automatic calibration is configured to (i) search for an estimated true angle based on a second histogram of angles, (ii) determine a mounting angle correction in response to said estimated true angle and (iii) calibrate said Doppler measurements generated by each of said plurality of radar devices based on said mounting angle correction.

9. The apparatus according to claim 8, wherein said search for said estimated true angle comprises cosine compensation, road slope estimation, host movement compensation, erosion filtering, field of view overlap scoring, an angle search from position, an angle search from velocity, a weighted scoring, an estimated true angle estimate per frame and inter-frame averaging.

10. The apparatus according to claim 8, wherein said mounting angle correction comprises determining a three dimensional rotation and translation values to achieve said mounting angle correction.

11. The apparatus according to claim 8, wherein (i) said second histogram of angles comprises a plurality of angle bins and (ii) said mounting angle correction comprises determining one of said angle bins having a highest density of detections of said plurality of targets.

12. The apparatus according to claim 8, wherein (i) said processor is further configured to present said mounting angle correction to a respective one of said plurality of radar devices and (ii) a mounting angle driver is configured to automatically adjust a respective one of said plurality of radar devices to said estimated true angle in response to said mounting angle correction.

13. The apparatus according to claim 1, wherein said ego speed is used to determine a position of a moving vehicle.

14. The apparatus according to claim 1, wherein said automatic calibration is configured to provide consistency for calculating said ego speed and enable a generation of an accurate radar point cloud of said field of view for calculating said ego speed.

15. The apparatus according to claim 1, wherein said histogram of said Doppler measurements comprises a histogram resolution of 0.1 m/s Doppler bins.

16. The apparatus according to claim 1, wherein said peak of said histogram of said Doppler measurements is determined without a Doppler flip when said Doppler measurement has no maximum limitation.

17. The apparatus according to claim 1, wherein said peak of said histogram of said Doppler measurements is determined in response to a number of Doppler flips when said Doppler measurement has a maximum limitation.

18. The apparatus according to claim 17, wherein said number of Doppler flips are implemented to provide a correct estimation of said peak in response to Doppler ambiguity.

19. The apparatus according to claim 1, wherein (i) said histogram comprises a plurality of Doppler speed measurements that are cosine corrected divided into a plurality of Doppler speed bins, (ii) said peak of said histogram comprises determining one of said Doppler speed bins having a highest density of detections of said plurality of targets.

20. The apparatus according to claim 1, wherein said raw radar data comprises a volume of data that undersamples said environment.

* * * * *